United States Patent
Ikawa et al.

(10) Patent No.: US 10,697,440 B2
(45) Date of Patent: Jun. 30, 2020

(54) METHOD OF DETECTING DAMAGE OF WIND TURBINE BLADE, AND WIND TURBINE

(71) Applicant: MITSUBISHI HEAVY INDUSTRIES, LTD., Tokyo (JP)

(72) Inventors: Yoshikatsu Ikawa, Tokyo (JP); Katsuhiko Takita, Tokyo (JP); Takao Kuroiwa, Tokyo (JP); Mitsuya Baba, Tokyo (JP); Kazunari Ide, Tokyo (JP); Takuya Koyanagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 458 days.

(21) Appl. No.: 15/671,776

(22) Filed: Aug. 8, 2017

(65) Prior Publication Data
US 2018/0230971 A1  Aug. 16, 2018

(30) Foreign Application Priority Data

Feb. 13, 2017  (JP) .................................. 2017-023978

(51) Int. Cl.
*F03D 17/00* (2016.01)
*G01D 5/353* (2006.01)
(Continued)

(52) U.S. Cl.
CPC .......... *F03D 17/00* (2016.05); *G01D 5/35303* (2013.01); *G01M 5/0033* (2013.01);
(Continued)

(58) Field of Classification Search
CPC ...................................................... F03D 17/00
(Continued)

(56) References Cited

U.S. PATENT DOCUMENTS 6,212,306 B1  4/2001 Cooper et al.
7,379,169 B1  5/2008 Kraemer et al.
(Continued)

FOREIGN PATENT DOCUMENTS

EP  2112375 A2  10/2009
EP  3062131 A1  8/2016
(Continued)

OTHER PUBLICATIONS

Europe Patent Office, "Search Report for European Patent Application No. 17185633.9," dated Feb. 21, 2018.
(Continued)

*Primary Examiner* — Ricky Ngon
(74) *Attorney, Agent, or Firm* — Manabu Kanesaka; Benjamin Hauptman; Kenneth Berner

(57) ABSTRACT

A method of detecting a damage of a wind turbine blade of a wind turbine rotor includes: a light input step of inputting light into a fiber-optic sensor mounted to the wind turbine blade; a light detection step of detecting reflection light from the grating portion; an obtaining step of obtaining a wavelength fluctuation index representing a fluctuation amount of a wavelength of the reflection light detected in the light detection step; and a detection step. The detection step includes detecting the presence or the absence of the damage of the wind turbine blade based on the wavelength fluctuation index taking account of a correlation between the wavelength fluctuation index of the wind turbine blade and a load index related to a load applied to the wind turbine blade, or a correlation between the wavelength fluctuation index and a temperature index related to a temperature of the wind turbine blade.

11 Claims, 11 Drawing Sheets

(51) Int. Cl.
*G01M 5/00* (2006.01)
*G01M 11/08* (2006.01)
*G01L 1/24* (2006.01)

(52) U.S. Cl.
CPC ..... *G01M 11/085* (2013.01); *F05B 2270/303* (2013.01); *F05B 2270/326* (2013.01); *F05B 2270/803* (2013.01); *F05B 2270/804* (2013.01); *G01L 1/246* (2013.01)

(58) Field of Classification Search
USPC .......................................................... 702/35
See application file for complete search history.

(56) References Cited

U.S. PATENT DOCUMENTS

| | | | |
|---|---|---|---|
| 8,310,657 B2* | 11/2012 | Olesen | G01M 11/083 290/44 |
| 9,255,886 B2 | 2/2016 | Glavind et al. | |
| 2008/0145007 A1 | 6/2008 | Crumpton | |
| 2009/0246019 A1 | 10/2009 | Volanthen et al. | |
| 2010/0004878 A1 | 1/2010 | Volanthen et al. | |
| 2010/0054935 A1 | 3/2010 | Olesen | |
| 2010/0128258 A1 | 5/2010 | Volanthen et al. | |
| 2010/0134782 A1 | 6/2010 | Roberts et al. | |
| 2010/0209248 A1 | 8/2010 | Volanthen et al. | |
| 2011/0040497 A1 | 2/2011 | Olesen | |
| 2011/0085156 A1 | 4/2011 | Jones et al. | |
| 2011/0096321 A1 | 4/2011 | Roberts | |
| 2011/0135476 A1 | 6/2011 | Olesen | |
| 2011/0211200 A1 | 9/2011 | Cribbs | |
| 2012/0035865 A1 | 2/2012 | Fujioka et al. | |
| 2013/0280070 A1* | 10/2013 | Lindby | F03D 1/065 416/61 |
| 2013/0287567 A1* | 10/2013 | Olesen | F03D 7/0288 416/1 |
| 2014/0151578 A1* | 6/2014 | Glavind | G01M 5/0016 250/459.1 |
| 2014/0239166 A1* | 8/2014 | Hjort | G01M 5/0016 250/227.18 |
| 2015/0345467 A1* | 12/2015 | Kramer | F03D 17/00 415/1 |
| 2016/0186722 A1 | 6/2016 | Olesen | |
| 2016/0245262 A1 | 8/2016 | Ide et al. | |

FOREIGN PATENT DOCUMENTS

| | | |
|---|---|---|
| GB | 2488123 A | 8/2012 |
| JP | 2004-301030 A | 10/2004 |
| JP | 4951814 B2 | 6/2012 |
| JP | 2016-156674 A | 9/2016 |
| WO | 2015/014366 A1 | 2/2015 |
| WO | 2015/070870 A1 | 5/2015 |
| WO | 2017/000947 A1 | 1/2017 |

OTHER PUBLICATIONS

Japan Patent Office, "Office Action for Japanese Patent Application No. 2017-023978," dated Oct. 23, 2019.

* cited by examiner

METHOD OF DETECTING DAMAGE OF WIND TURBINE BLADE, AND WIND TURBINE

RELATED APPLICATIONS

The present application is based on, and claims priority from, Japanese Application No. JP2017-023978 filed Feb. 13, 2017, the disclosure of which is hereby incorporated by reference herein in its entirety.

TECHNICAL FIELD

The present disclosure relates to a method of detecting a damage of a wind turbine blade, and a wind turbine.

BACKGROUND ART

It is known to detect a damage of a wind turbine blade on the basis of strain that occurs in a wind turbine blade.

For instance, Patent Document 1 discloses detecting presence or absence of a damage of a wind turbine blade on the basis of wavelength of reflection light from a grating portion of a fiber-optic sensor mounted to the wind turbine blade, the wave length being obtained as data related to strain of the wind turbine blade. Furthermore, Patent Document 1 discloses detecting a damage of a wind turbine blade by using a wavelength fluctuation index indicating a fluctuation amount of the above described wavelength in order to eliminate measurement errors of the fiber-optic sensor accompanying a temperature change in the ambient temperature or the like.

CITATION LIST

Patent Literature

Patent Document 1: JP2016-156674A

SUMMARY

Problems to be Solved

Meanwhile, as a result of intensive researches by the present inventors, it was found that the output characteristics of fiber-optic sensors mounted to a wind turbine blade has individual variability with respect to the load applied to the wind turbine blade or the temperature, and that the wavelength fluctuation index obtained by each fiber-optic sensor is affected by the load or the temperature. Accordingly, if damage determination is performed by using the wavelength fluctuation index without taking account of the individual variability of the fiber-optic sensors with respect to load applied to the wind turbine blade or temperature, there is a risk of failing to detect a damage of the wind turbine blade appropriately.

In this regard, Patent Document 1 does not specifically disclose detecting a damage taking account of the individual variability of fiber-optic sensors with respect to load applied to the wind turbine blade or temperature.

In view of the above, an object of at least one embodiment of the present invention is to provide a method of detecting a damage of a wind turbine blade with high accuracy.

Solution to the Problems (1) A method of detecting a damage of a wind turbine blade of a wind turbine rotor including at least one wind turbine blade, according to at least one embodiment of the present invention, includes: a light input step of inputting light into a fiber-optic sensor mounted to each of the wind turbine blade and having a grating portion at which a refractive index changes periodically in a longitudinal direction; a light detection step of detecting reflection light from the grating portion; an obtaining step of obtaining a wavelength fluctuation index which represents a fluctuation amount of a wavelength of the reflection light detected in the light detection step from a temporal change of the wavelength; and a detection step of detecting presence or absence of a damage of the wind turbine blade on the basis of the wavelength fluctuation index calculated in the obtaining step. The detection step comprises detecting the presence or the absence of the damage of the wind turbine blade on the basis of the wavelength fluctuation index taking account of at least one of a correlation between the wavelength fluctuation index of the wind turbine blade and a load index related to a load applied to the wind turbine blade, or a correlation between the wavelength fluctuation index of the wind turbine blade and a temperature index related to a temperature of the wind turbine blade.

The output characteristics of the fiber-optic sensors mounted to the wind turbine blade have individual variability depending on load applied to the wind turbine blade or temperature, and the wavelength fluctuation index obtained by each fiber-optic sensor may be affected by the load or the temperature.

In this regard, according to the above method (1), when detecting a damage of the wind turbine blade on the basis of the wavelength fluctuation index, the correlation between the wavelength fluctuation index and the load index related to load applied to the wind turbine blade or the temperature index related to temperature of the wind turbine blade is taken into account, and thereby it is possible to suppress wrong detection or the like due to an influence of individual variability of the characteristics of the fiber-optic sensors with respect to load or temperature, and to detect a damage of the wind turbine blade accurately.

(2) In some embodiments, in the above method (1), the detection step comprises detecting the presence or the absence of the damage of the wind turbine blade on the basis of a result of comparison between an evaluation value obtained from the wavelength fluctuation index of the wind turbine blade and a threshold, and the threshold is a corrected threshold corrected on the basis of the correlation.

According to the above method (2), when determining presence or absence of a damage of the wind turbine blade, the method uses a corrected threshold corrected on the basis of the correlation between the wavelength fluctuation index and the load index or the temperature index described above, as a threshold to be compared with the evaluation value obtained from the wavelength fluctuation index of the wind turbine blade. Thus, according to the above method (2), it is possible to suppress wrong detection or the like due to an influence of individual variability of the characteristics of the fiber-optic sensors with respect to load or temperature, and to detect a damage of a wind turbine blade accurately.

(3) In some embodiments, in the above method (1), the detection step comprises detecting the presence or the absence of the damage of the wind turbine blade on the basis of a result of comparison between an evaluation value obtained from the wavelength fluctuation index of the wind turbine blade and a threshold, and the evaluation value to be compared to the threshold is a corrected evaluation value corrected on the basis of the correlation.

According to the above method (3), the method uses a corrected evaluation value corrected on the basis of the correlation between the wavelength fluctuation index and the load index or the temperature index described above as an evaluation value based on the wavelength fluctuation index to be compared with the threshold to determine presence or absence of a damage of the wind turbine blade. Thus, according to the above method (3), it is possible to suppress wrong detection or the like due to an influence of individual variability of the characteristics of the fiber-optic sensors with respect to load or temperature, and to detect a damage of the wind turbine blade accurately.

(4) In some embodiments, in the above method (2) or (3), the wind turbine rotor comprises a plurality of wind turbine blades. The detection step includes: calculating an average of the wavelength fluctuation index of the plurality of wind turbine blades as the load index; obtaining the corrected threshold or the corrected evaluation value on the basis of correlation between the wavelength fluctuation index of one wind turbine blade to be detected among the plurality of wind turbine blades and the average of the wavelength fluctuation index of the plurality of wind turbine blades; and detecting the damage of the wind turbine blade by using the corrected threshold or the corrected evaluation value.

In a wind turbine provided with a plurality of wind turbine blades, an average of the wavelength fluctuation index of the plurality of wind turbine blades serves as the index of load applied to each wind turbine blade. According to the above method (4), the evaluation value for determining presence or absence of a damage of the wind turbine blade or the threshold to be compared with the evaluation value is corrected by using an average of the wavelength fluctuation index of the plurality of wind turbine blades as the load index, and thereby it is possible to detect a damage of the wind turbine blade precisely.

(5) In some embodiments, in the above method (2) or (3), the detection step includes: specifying a temperature range in which an absolute value of a change rate of the wavelength fluctuation index relative to the temperature index becomes larger; and detecting the damage of the wind turbine blade by using the corrected threshold or the corrected evaluation value obtained on the basis of the correlation between the wavelength fluctuation index of the wind turbine blade and the temperature index when a temperature of the wind turbine blade is in the temperature range.

The wavelength fluctuation index of the wind turbine blade may change depending on the fiber-optic sensor, even if the load applied to the wind turbine blade is a constant value. For instance, even if the load applied to the wind turbine blade is a constant value, the change rate of the wavelength fluctuation index of the wind turbine blade when the temperature of the wind turbine blade is within a temperature range may be greater or smaller than when the temperature of the wind turbine blade is within another temperature range. According to the above method (5), when the temperature of the wind turbine blade is within a temperature range in which the absolute value of the change rate of the wavelength fluctuation index with respect to the temperature index becomes larger, the evaluation value for determining presence or absence of a damage of the wind turbine blade or the threshold to be compared with the evaluation value is corrected on the basis of correlation between the wavelength fluctuation index and the temperature index. Accordingly, it is possible to detect a damage of the wind turbine blade precisely.

(6) In some embodiments, in any one of the above configurations (1) to (5), the obtaining step comprises calculating a difference between a maximum of the wavelength and a minimum of the wavelength in the temporal change as the wavelength fluctuation index.

A difference between a maximum and a minimum in the temporal change of the wavelength of the reflection light by the fiber-optic sensor represents the amount of fluctuation in the wavelength of reflection light in a period between the time when the wavelength of reflection light is at the maximum and the time when the wavelength of reflection light is at the minimum. Thus, according to the above method (6), it is possible to detect a damage of the wind turbine blade by using a difference between the maximum and the minimum of the wavelength of the reflection light as the wavelength fluctuation index.

(7) In some embodiments, in the above method (6), the obtaining step comprises calculating a difference between the maximum and the minimum which appear alternately and repeatedly corresponding to a rotation period of the wind turbine rotor as the wavelength fluctuation index.

As the azimuth angle of the wind turbine blade changes in accordance with rotation of the wind turbine rotor, the altitude of the wind turbine blade also changes. Furthermore, generally, the higher the altitude, the greater the wind velocity. Thus, during operation of the wind turbine, accompanying rotation of the wind turbine rotor, the wind load applied to the wind turbine blade changes periodically in accordance with the wind velocity, and thus the strain of the wind turbine blade changes periodically, so does the wavelength of reflection light at the fiber-optic sensor that represents the strain of the wind turbine blade. According to the above method (7), it is possible to calculate the wavelength fluctuation index for detecting a damage of the wind turbine blade more appropriately, on the basis of the maximum and the minimum that appear alternately and repeatedly corresponding to the rotation period of the wind turbine rotor.

(8) In some embodiments, in the above method (6) or (7), provided that T is a rotation period of the wind turbine rotor, the obtaining step comprises not determining a second extreme value next to a first extreme value which is the maximum or the minimum, until a period t (where $0.1\,T \le t \le 0.5\,T$) elapses after a point of time when the first extreme value appears.

Load applied to a wind turbine blade due to wind is normally largest when the wind turbine blade is in the uppermost position and smallest when the wind turbine blade is in the lowermost position. Thus, provided that T is the rotation period of the wind turbine rotor, the maximum and the minimum of the wavelength of reflection wave accompanying rotation of the wind turbine rotor appear every T/2, approximately. However, besides the maximum or the minimum that accompanies rotation of the wind turbine rotor, a maximum or a minimum may appear locally due to temporal fluctuation of wind velocity, for instance. Thus, to precisely determine the maximum and the minimum that accompany rotation of the wind turbine rotor from the temporal change of the wavelength of reflection light by the fiber-optic sensors, it is desirable to be able to eliminate such local extreme values.

According to the above method (8), in the period of T/2 during which the maximum and the minimum accompanying rotation of the wind turbine rotor appear once each, the second extreme value (minimum or maximum) next to the first extreme value is not determined until the predetermined period t passes after a point of time when the first extreme value (maximum or minimum) appears, which makes it possible to eliminate the maximum or the minimum that appears locally in the period t and to calculate the wavelength fluctuation index more accurately.

(9) In some embodiments, in any one of the above methods (1) to (8), the method further includes a time-average calculation step of calculating an average of the wavelength fluctuation index calculated in the obtaining step for a period not shorter than a rotation period of the wind turbine rotor. The detection step comprises detecting the damage of the wind turbine blade on the basis of the average calculated in the time-average calculation step.

In the above method (9), the method uses an average value of the wavelength fluctuation index in a predetermined period that is equal to or longer than the rotation period of the wind turbine rotor. Thus, in a period shorter than the period, even if the wavelength fluctuation index rapidly increases due to a sudden increase in strain caused by gust or the like, it is possible to detect a damage of the wind turbine blade more appropriately thanks to the averaged wavelength fluctuation index.

(10) In some embodiments, in any one of the above methods (1) to (9), the wind turbine rotor comprises a plurality of wind turbine blades. The method further comprises a difference calculation step of calculating a difference between the wavelength fluctuation index of one wind turbine blade to be detected from among the plurality of wind turbine blades and a reference value reflecting the wavelength fluctuation index of at least one wind turbine blade for comparison from among remaining wind turbine blades as the evaluation value. The detection step comprises detecting the damage of the wind turbine blade to be detected on the basis of a temporal change of the difference calculated in the difference calculation step.

According to the above method (10), a difference between the wavelength fluctuation index of one wind turbine blade to be detected among the plurality of wind turbine blades and a standard value reflecting the wavelength fluctuation index of at least one wind turbine blade for comparison among the remaining wind turbine blades is used to detect a damage of the wind turbine blade, and thus it is possible to eliminate an influence on damage detection from the operational state such as a change in the wind velocity. Thus, it is possible to detect abnormality due to a damage of the wind turbine blade more appropriately.

(11) In some embodiments, in the above method (10), the wind turbine rotor comprises three or more wind turbine blades. The difference calculation step is repeated for each of the wind turbine blades being the wind turbine blade to be detected to calculate the difference for each of the wind turbine blades. The detection step comprises specifying the wind turbine blade having the damage on the basis of the difference of each of the wind turbine blades.

When a damage occurs in one of the plurality of wind turbine blades, the magnitude of the difference is affected by whether the wind turbine blade is the wind turbine blade to be detected. Accordingly, as in the method (11), it is possible to specify the wind turbine blade with a damage, from the magnitude of the difference of each wind turbine blade calculated repeatedly for each wind turbine blade being the wind turbine blade to be detected.

(12) A wind turbine according to at least one embodiment of the present invention comprises: a wind turbine rotor including at least one wind turbine blade; a fiber-optic sensor mounted to each of the wind turbine blade and having a grating portion at which a refractive index changes periodically in a longitudinal direction; a light input part for inputting light into the fiber-optic sensor; a light detection part for detecting reflection light from the grating portion; and a detection part for detecting a damage of the wind turbine blade. The detection part is configured to: obtain a wavelength fluctuation index which represents a fluctuation amount of a wavelength of the reflection light detected by the light detection part from a temporal change of the wavelength; and detect presence or absence of the damage of the wind turbine blade on the basis of the wavelength fluctuation index taking account of at least one of a correlation between the wavelength fluctuation index of the wind turbine blade and a load index related to a load applied to the wind turbine blade, or a correlation between the wavelength fluctuation index of the wind turbine blade and a temperature index related to a temperature of the wind turbine blade.

With the above configuration (12), when detecting a damage of the wind turbine blade on the basis of the wavelength fluctuation index, the correlation between the wavelength fluctuation index and the load index related to load applied to the wind turbine blade or the temperature index related to temperature of the wind turbine blade is taken into account, and thereby it is possible to suppress wrong detection or the like due to an influence of individual variability of the characteristics of the fiber-optic sensors with respect to load or temperature, and to detect a damage of a wind turbine blade accurately.

Advantageous Effects

According to at least one embodiment of the present invention, it is possible to provide a method of detecting a damage of a wind turbine blade with high accuracy.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
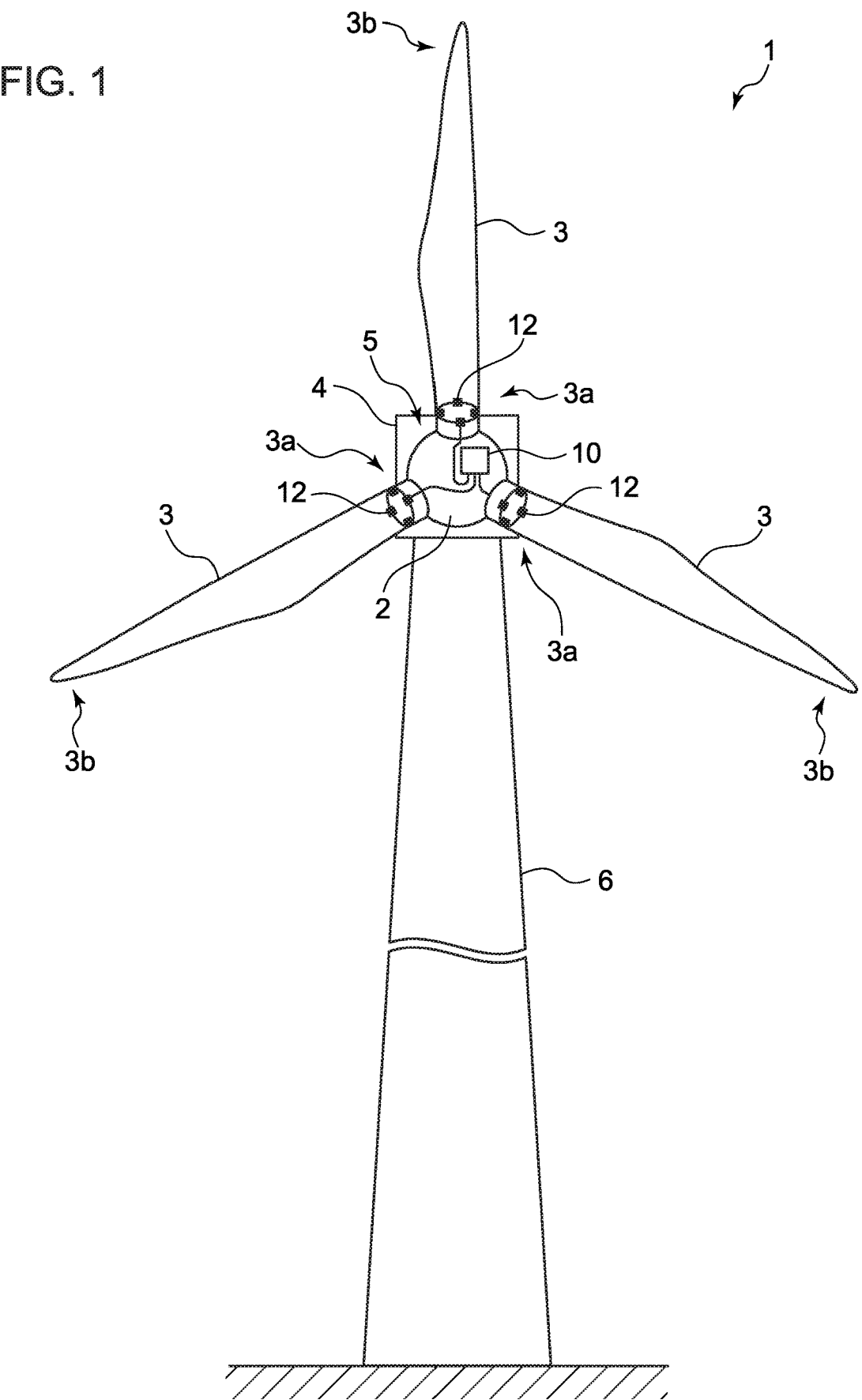
FIG. 1 is a schematic diagram illustrating an overall configuration of a wind turbine according to an embodiment.

First, a configuration of a wind turbine including a wind turbine blade whose damage is to be detected in an embodiment will be described. FIG. 1 is a schematic diagram illustrating an overall configuration of a wind turbine according to an embodiment. As shown in the drawing, the wind turbine 1 includes a wind turbine rotor 5 provided with at least one wind turbine blades 3 and a hub 2 with the wind turbine blades 3 mounted thereto. The wind turbine rotor 5 is disposed on a top portion of a tower 6 and is rotatably supported to a nacelle 4 supported to the tower 6. The wind turbine rotor 5 including the wind turbine blades 3 rotates as the wind turbine blades 3 receive wind.

In some embodiments, the wind turbine 1 may be a part of a wind turbine power generating apparatus. In this case, the nacelle 4 may house a generator (not depicted) and a power transmission mechanism (not depicted) for transmitting rotation of the wind turbine rotor 5 to the generator. The wind turbine power generating apparatus is configured such that rotation energy transmitted to the generator via the power transmission mechanism from the wind turbine rotor 5 is converted into electric energy by the generator.

Figure 2:
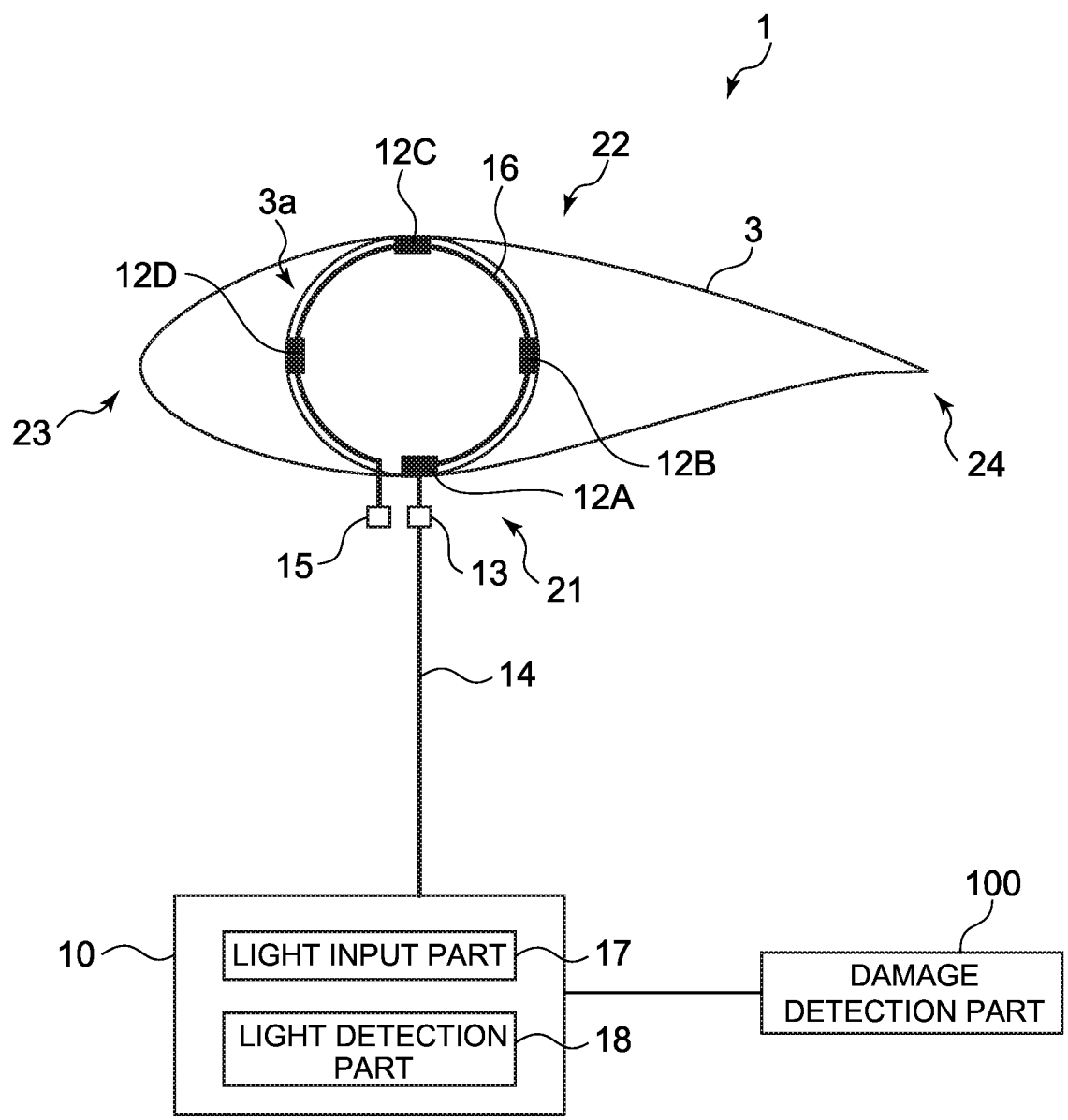
FIG. 2 is a schematic diagram showing a cross section perpendicular to the longitudinal direction of the wind turbine blade, at a blade root portion of the wind turbine blade, according to an embodiment.

FIG. 2 is a schematic diagram showing a cross section perpendicular to the longitudinal direction of the wind turbine blade, at a blade root portion of the wind turbine blade, according to an embodiment.

As shown in FIGS. 1 and 2, the wind turbine 1 includes fiber-optic sensors 12 (12A to 12D) mounted to the blade root portion 3a of each of the wind turbine blades 3, a light-source/signal processing unit 10 including a light input part 17 and a light detection part 18, and a damage detection part 100.

The fiber-optic sensors 12 have a grating portion at which a refractive index changes periodically in the longitudinal direction.

When light having a broadband spectrum enters the fiber-optic sensor 12, reflection at the grating portion where the refractive index periodically changes interferes only with a specific wavelength depending on the grating period in a direction to enhance each other. Accordingly, the fiber-optic sensor 12 reflects only the wavelength components having a specific configuration, and let other wavelengths transmit.

When the strain applied to the fiber-optic sensor 12 or the surrounding temperature changes, the refractive index and the grating period of the grating portion change, and the wavelength of reflection light changes in accordance with such change. The wavelength $\lambda_o$ of reflection light can be expressed approximately by the following expression (A').

$$\lambda_o - \lambda_i = (\varepsilon_z + \alpha \cdot \Delta T)/p \quad (A')$$

In the expression (A'), $\varepsilon_z$ is strain of optical fiber, $\lambda_o$ is wavelength of reflection wave, $\lambda_i$ is initial wave length, $\alpha$ is temperature coefficient, $\Delta T$ is a difference between the optical fiber temperature and the standard temperature (temperature change), and p is wavelength minus strain conversion factor. Herein, the temperature coefficient $\alpha$ is a sum of the heat expansion coefficient $\alpha_\Lambda$ and heat minus light coefficient $\alpha_n$ ($\alpha=\alpha_\Lambda+\alpha_n$). $\alpha_\Lambda$ represents a change in the grating period due to the temperature, and $\alpha_n$ represents a change in the refractive index due to the temperature.

Accordingly, a difference between the wavelength $\lambda_o$ of reflection light and the initial wavelength $\lambda_i$ at the fiber-optic sensor 12 is affected by the strain $\varepsilon_z$ of the fiber-optic sensor 12 and the temperature $\Delta T$. Thus, in a case where the initial wavelength $\lambda_i$ is a default value, it is possible to detect strain that occurs in the fiber-optic sensor 12 and the temperature of optical fiber by measuring the wavelength $\lambda_o$ of reflection light.

In an embodiment, the fiber-optic sensor 12 is a fiber bragg grating (FBG) sensor.

Four fiber-optic sensors 12A to 12D are mounted to the blade root portion 3a of each wind turbine blade 3. As shown in FIG. 2, the blade root portion 3a of the wind turbine blade 3 has a cross section of a substantially circular shape. The fiber-optic sensors 12A to 12D are attached to the wall surface of the blade root portion 3a away from one another at an interval of 90°. In the present embodiment, the four fiber-optic sensors 12A, 12B, 12C, and 12D are attached to the wall surface of the blade root portion 3a at the pressure side (HP side) 21, the trailing edge side 24, the suction side (LP side) 22, and the leading edge side 23 of the wind turbine blade 3, respectively in this order. When strain occurs in the blade root portion 3a, each of the fiber-optic sensors 12A to 12D develops strain corresponding to strain of the section to which each fiber-optic sensor is mounted.

Furthermore, the four fiber-optic sensors 12A, 12B, 12C, and 12D are connected in series in this order through a fiber-optic cable 16. Connectors (13, 15) are disposed on both ends of the fiber-optic cable 16. A fiber-optic cable 14 for connecting the fiber-optic sensors 12A to 12D and the light-source/signal processing unit 10 and the fiber-optic cable 16 for connecting the fiber-optic sensors 12A to 12D in series are connected via the connector 13 or the connector 15.

While four fiber-optic sensors 12A to 12D are mounted to one wind turbine blade 3 in the embodiment shown in FIG. 2, it is sufficient in another embodiment if at least one fiber-optic sensor 12 is mounted to each wind turbine blade 3. In an embodiment, a fiber-optic sensor 12 is mounted to at least the pressure side 21 (the section where the fiber-optic sensor 12A is mounted in FIG. 2) of the wind turbine blade 3. Further, in an embodiment, fiber-optic sensors 12 are mounted to at least the pressure side 21 and the suction side 22 (the section where the fiber-optic sensor 12C is mounted in FIG. 2) of the wind turbine blade 3.

Further, while the fiber-optic sensors 12 are mounted to the blade root portion 3a of the wind turbine blade 3 in the above described example, the position for mounting the fiber-optic sensors 12 to the wind turbine blade 3 is not limited to the blade root portion 3a. For instance, the fiber-optic sensors 12 may be mounted to the tip portion 3b (see FIG. 1) of the wind turbine blade 3. Furthermore, a plurality of fiber-optic sensors 12 may be attached to the wall surface of the tip portion 3b at each of the pressure side (HP side), the trailing edge side, the suction side (LP side), and the leading edge side of the wind turbine blade 3.

The fiber-optic sensors 12 may be mounted to each of the blade root portion 3a and the tip portion 3b of the wind turbine blade 3.

In an embodiment, the light-source/signal processing unit 10 including the light input part 17 and the light detection part 18 is disposed inside the hub 2.

The light input part 17 is configured to input light into the fiber-optic sensors 12A to 12D. The light input part 17 has a light source capable of emitting light having a broadband spectrum.

The light detection part 18 is configured to detect reflection light from the grating portion of each of the fiber-optic sensors 12A to 12D.

The broadband light emitted from the light input part 17 is transmitted through the fiber-optic cables (14, 16) and input into each of the fiber-optic sensors 12A to 12D. At each of the fiber-optic sensors 12A to 12D, of the input light, only the light having a specific wavelength corresponding to the strain and the temperature of each grating portion is reflected at the grating portion. The reflection light reflected at the grating portion is transmitted through the fiber-optic cables (16, 14) and detected by the light detection part 18.

The fiber-optic sensors 12A to 12D are connected in series, and the distances from the light input part 17 to the respective fiber-optic sensors 12A to 12D and the distances from respective the fiber-optic sensors 12A to 12D to the light detection part 18 are different from one another. Thus, the light detection part 18 can determine from which one of the fiber-optic sensors 12 the detected reflection light is emitted, depending on the time it takes after emission of the light by the light input part 17 before detection of the reflected light from each of the fiber-optic sensors 12A to 12D by the light detection part 18.

The damage detection part 100 is configured to obtain a wavelength fluctuation index indicating a fluctuation amount of the wavelength from a temporal change of the wavelength of reflection light detected by the light detection part 18, and to detect presence or absence of a damage of a wind turbine blade on the basis of the wavelength fluctuation index. The damage detection part 100 is configured to detect a damage of the wind turbine blade 3, specifically following the method of detecting a damage described in detail below.

A damage of the wind turbine blade 3 includes, for instance, cracks formed on the wind turbine blade 3. When a damage including cracks or the like occurs and develops on the wind turbine blade 3, there is a risk of occurrence of an accident such as breakage of the wind turbine blade 3. Thus, by detecting a damage of the wind turbine blade 3 appropriately, it is possible to determine a suitable time for maintenance of the wind turbine blade 3, and to operate the wind turbine 1 safely.

Next, a method of detecting a damage of the wind turbine blade 3 of the wind turbine 1 having the above described configuration will be described.

Figure 3:
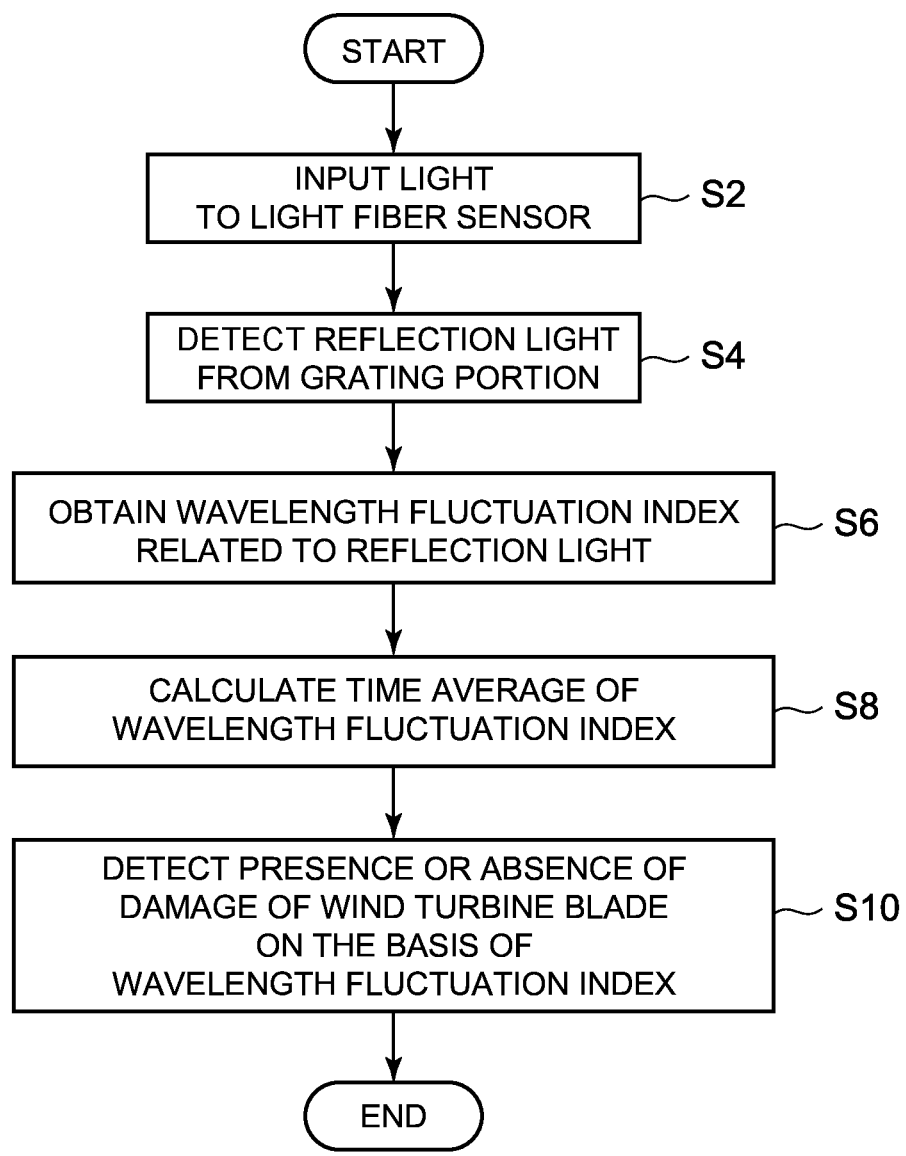
FIG. 3 is a flowchart of a method of detecting a damage of a wind turbine blade according to an embodiment.

FIG. 3 is a flowchart of a method of detecting a damage of a wind turbine blade according to an embodiment. In the method of detecting a damage of the wind turbine blade 3 shown in the flowchart of FIG. 3, light is input to the fiber-optic sensors 12A to 12D mounted to each of the wind turbine blades 3 (S2: light input step), and reflection light reflected at the grating portions of the fiber-optic sensors 12A to 12D is detected (S4: light detection step). Next, a wavelength fluctuation index indicating a fluctuation amount of the wavelength of reflection light is obtained from the temporal change of the wavelength of the reflection light detected in the light detection step (S4) (S6: obtaining step). Then, on the basis of the wavelength fluctuation index calculated in the obtaining step (S6), presence or absence of the wind turbine blade 3 is detected (S10: detection step).

In some embodiments, the time average of the wavelength fluctuation index calculated in the obtaining step (S6) is calculated (S10: time-average calculation step), and in the detection step (S12), presence or absence of a damage of the wind turbine blade 3 may be detected on the basis of the average calculated in the time average step (S10).

As described below briefly, an influence from the temperature on the measurement value of the wave length of reflection waves by the fiber-optic sensors (i.e., the measurement value of strain) can be substantially eliminated by using the wavelength fluctuation index obtained by using the fiber-optic sensors 12.

In the fiber-optic sensor 12 having the grating portion, the wavelength $\lambda_o$ of reflection light from the grating portion is affected by both of the strain and the temperature at the grating portion. That is, the difference $(\lambda_o-\lambda_i)$ between the wave length $\lambda_i$ of input light to the fiber-optic sensor 12 and the wavelength $\lambda_o$ of reflection light from the grating portion depends on the strain that develops in the grating portion and depends on the temperature of optical fiber. The strain that occurs in the grating portion (i.e. strain that occurs in the wind turbine blade) $\varepsilon_z$ is expressed by the following expression (A).

$$\varepsilon_z = p \cdot (\lambda_o - \lambda_i) - \alpha \cdot \Delta T \tag{A}$$

In the expression (A), p is wavelength minus strain conversion factor, $\lambda_o$ is reflection wavelength, $\lambda_i$ is input wavelength, a is temperature coefficient, and $\Delta T$ is a difference between the optical fiber temperature and the standard temperature (temperature change). Specifically, the strain $\varepsilon_z$ is calculated by correcting the term of the detected wavelength $\lambda_o$ with the term of the temperature $\Delta T$.

From the above expression (A), the change amount $\varepsilon_{z1}-\varepsilon_{z2}$ of the strains $\varepsilon_{z1}$ and $\varepsilon_{z2}$ at two different time t1 and t2 can be expressed by the following expression (B).

$$\varepsilon_{z1} - \varepsilon_{z2} = p \cdot (\lambda_{o1} - \lambda_{o2}) + a \cdot (\Delta T_1 - \Delta T_2) \tag{B}$$

The input wavelength $\lambda_i$ is a fixed value, and if the temperature change $\Delta T$ is substantially unchanged in the period between t1 and t2, the second term on the right side of the above expression (B) is zero. For instance, in a short period of time such as a rotation period (normally from approximately four to seven seconds) of the wind turbine rotor 5, the optical fiber temperature may be considered not to change ($\Delta T_1 \neq \Delta T_2$). Thus, in this case, the following expression (C) is satisfied.

$$\varepsilon_{z1} - \varepsilon_{z2} = p \cdot (\lambda_{o1} - \lambda_{o2}) \tag{C}$$

As shown in the expression (C), the change amount of strain depends on the fluctuation amount $(\lambda_{o1}-\lambda_{o2})$ of the reflection wave, and does not depend on the optical fiber temperature or the temperature change. For instance, if there is a difference in the ambient temperature around the fiber-optic sensors due to a difference in season or the like, the magnitude $\varepsilon_z$ itself of strain measured by the fiber-optic sensors 12 may be affected by the temperature change. For instance, if there is a difference in the optical fiber temperature due to a difference in the ambient temperature, the calculation result of $\varepsilon_z$ from the above expression (A) may differ depending on the accuracy of the temperature factor $\alpha$ or the individual variability of the fiber-optic sensors, even if the amount of strain is in fact the same. On the other hand, even if there is a difference in the ambient temperature around the fiber-optic sensors 12, the change amount of strain $\varepsilon_{z1}-\varepsilon_{z2}$ is not affected by the temperature as shown in the expression (C).

Thus, it is possible to substantially eliminate the influence of the temperature on the measurement value of the wavelength $\lambda_o$ of refection waves by the fiber-optic sensors 12 (i.e. the measurement value of strain) by detecting presence or absence of a damage of the wind turbine blade on the basis of the wavelength fluctuation index indicating the fluctuation amount $(\lambda_{o1}-\lambda_{o2})$ of the wavelength. Thus, it is possible to detect a damage accurately even in an environment with a changing temperature.

Next, the following steps S2 to S10 will be described in detail.

Figure 4:
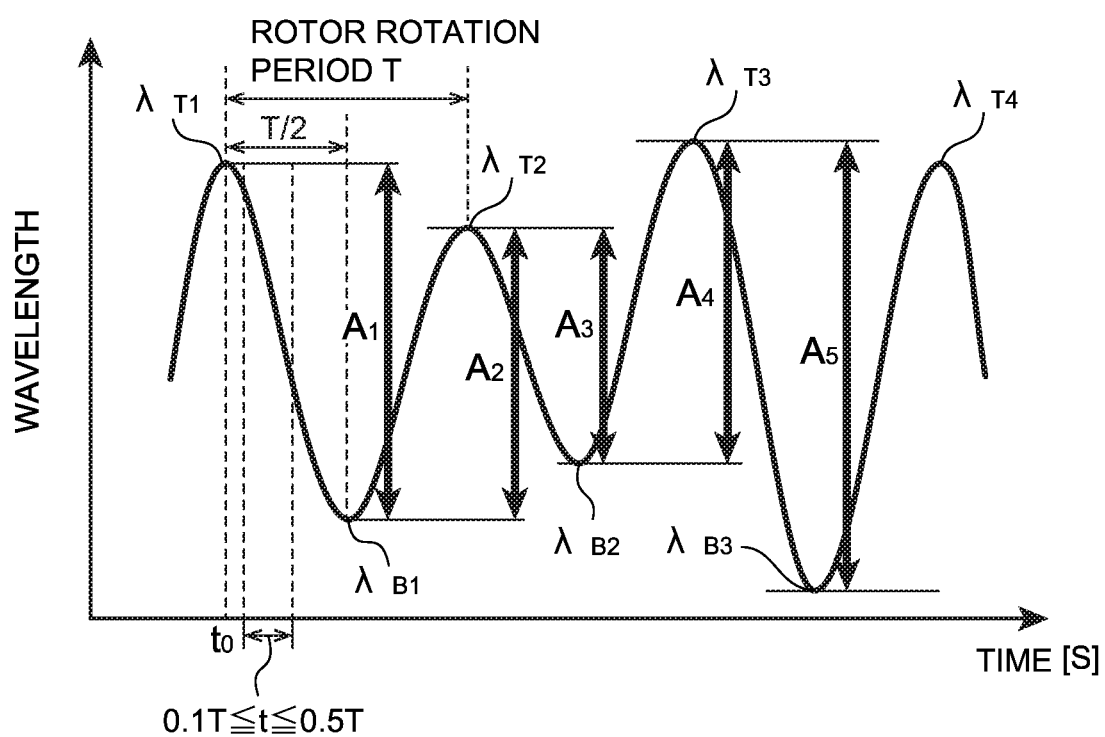
FIG. 4 is a graph showing an example of a temporal change of the wavelength of reflection light from a grating portion in a method of detecting a damage of a wind turbine blade according to an embodiment.

FIG. 4 is a graph showing an example of a temporal change of the wavelength of reflection light from a grating portion in a method of detecting a damage of a wind turbine blade according to an embodiment. In the light detection step (S4) of detecting the reflection light reflected at the grating portions of the fiber-optic sensors 12A to 12D (in the present specification, also referred to as merely "reflection light"), for instance, the temporal change of the wavelength of the reflection light shown in FIG. 4 is obtained. In FIG. 4, $\lambda_{Tn}$ is the maximum of the wavelength of reflection light, and $\lambda_{Bn}$ is the minimum of the wavelength of reflection light. Further, $A_n$ is a difference between a maximum and a minimum next to each other.

As shown in the graph of FIG. 4, the wavelength of reflection light changes with time while repeating the maximum $\lambda_{Tn}$ and the minimum $\lambda_{Bn}$. Typically, the maximum $\lambda_{Tn}$ and the minimum $\lambda_{Bn}$ appear alternatively and repeatedly corresponding to the rotation period of the wind turbine rotor 5. This is for the following reason.

As the azimuth angle of the wind turbine blade 3 changes in accordance with rotation of the wind turbine rotor 5, the altitude of the wind turbine blade 3 also changes. Furthermore, generally, the higher the altitude, the greater the wind velocity. Thus, during operation of the wind turbine 1, accompanying rotation of the wind turbine rotor 5, the wind load applied to the wind turbine blade 3 in accordance with the wind velocity changes periodically, and thus the strain of the wind turbine blade 3 changes periodically, so does the wavelength of reflection light at the fiber-optic sensor indicating the strain of the wind turbine blade 3. Thus, as described above, the maximum $\lambda_{Tn}$ and the minimum $\lambda_{Bn}$ appear alternatively and repeatedly corresponding to the rotation period of the wind turbine rotor 5. Furthermore, provided that T is the rotation period of the wind turbine rotor 5, the maximum $\lambda_{Tn}$ and the minimum $\lambda_{Bn}$ of the wavelength of reflection wave accompanying rotation of the wind turbine rotor 5 appear every T/2, approximately.

Specifically, the wind load applied to the wind turbine blade 3 is normally the greatest when the wind turbine blade 3 is at the uppermost position, and the wavelength of reflection light is at the maximum $\lambda_{Tn}$ at this time. Furthermore, the wind load applied to the wind turbine blade 3 is normally the smallest when the wind turbine blade 3 is at the lowermost position, and the wavelength of reflection light is at the minimum $\lambda_{Bn}$ at this time.

Figure 12:
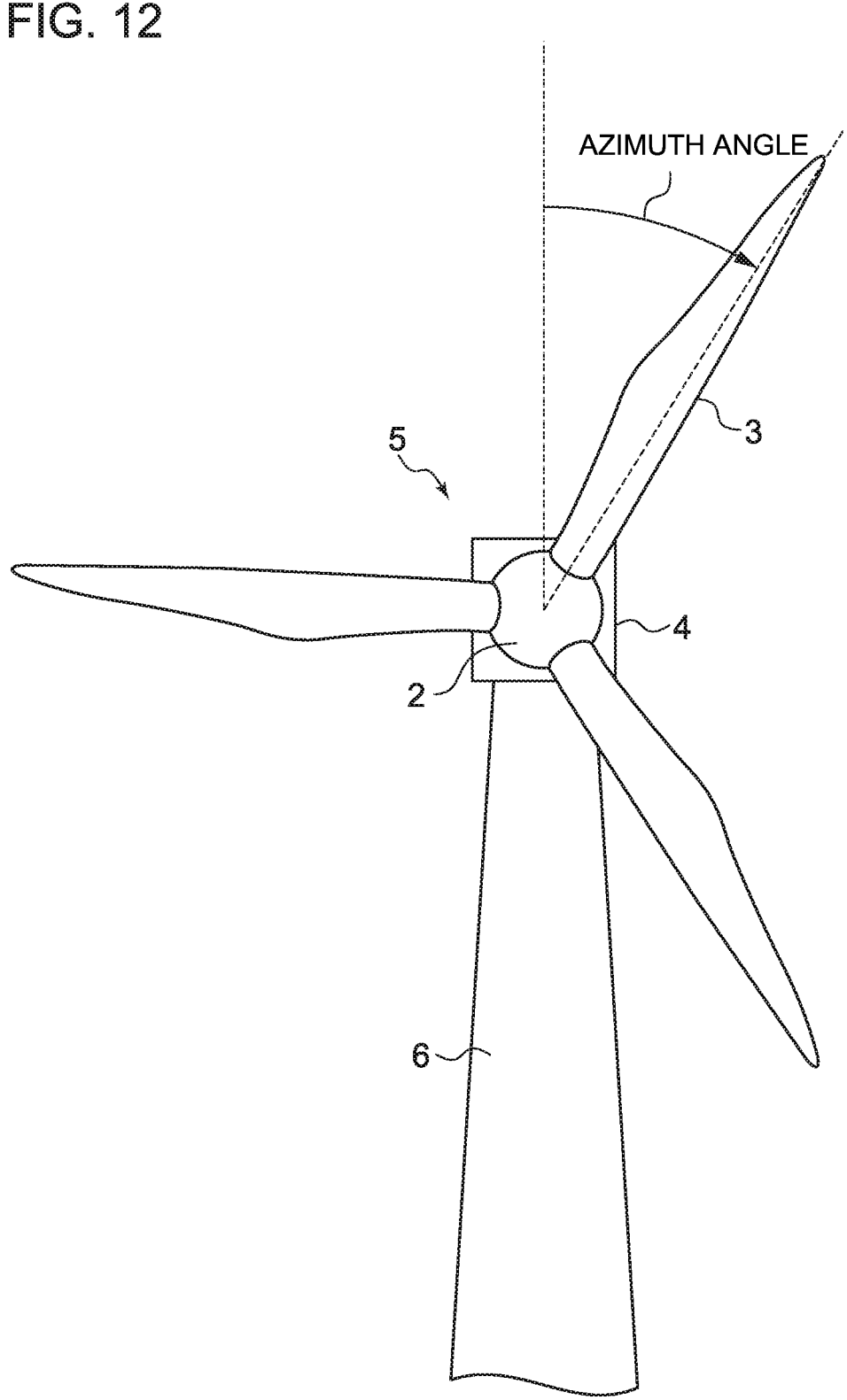
FIG. 12 is a diagram for describing an azimuth angle of a wind turbine blade.

Furthermore, as shown in FIG. 12, the azimuth angle is an angle formed between a predetermined standard and the axis of the wind turbine blade 3 in the rotational plane of the wind turbine blade 3, and in the present specification, the standard is the uppermost position of the wind turbine blade 3. In this case, the azimuth angle of the wind turbine blade 3 at the uppermost position of the wind turbine 1 is zero degree, and the azimuth angle of the wind turbine blade 3 at the lowermost position is 180 degrees. FIG. 12 is a diagram for describing the azimuth angle of a wind turbine blade.

In an embodiment, in the obtaining step (S6), a difference between the maximum and the minimum next to each other in the temporal change of reflection wave is calculated as the wavelength fluctuation index.

In FIG. 4, $A_n$ is a difference between the maximum and the minimum. For instance, $A_1$ is a difference $|\lambda_{T1}-\lambda_{B1}|$ between the maximum $\lambda_{T1}$ and the minimum $\lambda_{T1}$, while $A_2$ is a difference $|\lambda_{T2}-\lambda_{B1}|$ between the maximum $\lambda_{T2}$ and the minimum $\lambda_{B1}$. $A_3$ and the following can be calculated similarly.

The difference $A_n$ between the maximum and the minimum obtained as described above represents the amount of change in the wavelength of reflection light in a period between the time when the wavelength of reflection light is at the maximum and the time when the wavelength of reflection light is at the minimum. As describe above, it is possible to substantially eliminate the influence of the temperature on the measurement value of the wavelength of refection waves by the fiber-optic sensors (i.e. the measurement value of strain) by detecting presence or absence of a damage of the wind turbine blade on the basis of the wavelength fluctuation index $A_n$ indicating the fluctuation amount of the wavelength. Thus, it is possible to detect a damage accurately even in an environment with a changing temperature.

Meanwhile, in the temporal change of reflection waves, besides the maximum $\lambda_{Tn}$ or the minimum $\lambda_{Bn}$ that accompany rotation of the wind turbine rotor 5, a maximum and a minimum may appear locally due to temporal change of wind velocity, for instance. Thus, to precisely determine the maximum $\lambda_{Tn}$ and the minimum $\lambda_{Br}$ that accompany rotation of the wind turbine rotor 5 from the temporal change of the wavelength of reflection light by the fiber-optic sensors 12A to 12D, it is desirable to be able to eliminate such local extreme values.

In the obtaining step (S6), provided that T is the rotation period of the wind turbine rotor 5, determination of the second extreme value following the first extreme value (e.g. $\lambda_{T1}$) which is the maximum or the minimum in the temporal change of reflection wave may be stopped, until the period t (where 0.1 T≤t≤0.5 T) elapses after time to when the first extreme value ($\lambda_{T1}$) appears.

As described above, in the period of T/2 during which the maximum $\lambda_{Tn}$ and the minimum $\lambda_{Bn}$ accompanying rotation of the wind turbine rotor 5 appear once each, the second extreme value (minimum or maximum) next to the first extreme value (maximum or local) is not determined until the period t (where 0.1 T≤t≤0.5 T) passes after time to when the first extreme value appears, which makes it possible to eliminate the maximum or the minimum that appear locally in the period t and to calculate the wavelength fluctuation index more accurately.

In the time average calculation step (S8), the average value of the wavelength fluctuation index calculated in the obtaining step (S6) in the period $T_{AVE}$ which is equal to or longer than the rotation period T of the wind turbine rotor 5 is calculated.

To evaluate a damage of the wind turbine blade 3, the wind turbine blade 3 normally needs to be monitored for a long period of time, by the unit of weeks or months, for instance. Thus, the average of the wavelength fluctuation index in the period $T_{AVE}$ of an appropriate length suitable for the purpose is calculated, and thereby it is possible to detect a damage of the wind turbine blade 3 appropriately.

While a period $T_{AVE}$ for calculating an average of the wavelength fluctuation index is not particularly limited, it may be ten minutes, for instance.

In the time-average calculation step (S8), it may be determined whether the wavelength fluctuation index calculated in the obtaining step (S6) is valid data suitable as the wavelength fluctuation index or invalid data not suitable as the wavelength fluctuation index, and the average value may be calculated by using only the wavelength fluctuation index determined as valid data in the determination. Only the wavelength fluctuation index determined to be valid data in the above determination is used to calculate the average of the wavelength fluctuation index in the time average calculation step (S8), and thereby it is possible to detect a damage of the wind turbine blade 3 more accurately.

In the determination of whether the wavelength fluctuation index is valid data, the wavelength fluctuation index calculated by using a wavelength value of reflection light that indicates abnormality of the fiber-optic sensor 12 may be determined as invalid data. Alternatively, the wavelength fluctuation index obtained from a difference between the maximum of the wavelength of reflection light and the minimum greater than the maximum (i.e. the wavelength fluctuation index that is not normally calculated) may be determined as invalid data.

Furthermore, the wavelength fluctuation index that is not determined as invalid data may be determined as valid data.

Herein, the wavelength fluctuation index calculated by using a wavelength value of reflection light that indicates abnormality of the fiber-optic sensor 12 includes, for instance, a wavelength fluctuation index calculated when the wavelength data of reflection light detected by the light detection part 18 is not updated for a predetermined period or longer due to malfunction of the fiber-optic cable 14 or the like (when wavelength sticking occurs). Further, another example is the wavelength fluctuation index calculated in a case, for instance, where a wavelength value of reflection light detected by the light detection part 18 is out of the wavelength range that can be originally measured by the light detection part 18.

In the detection step (S10), at least one of the correlation between the wavelength fluctuation index of the wind turbine blade 3 and the load index related to load applied to the wind turbine blade 3, or the correlation between the wavelength fluctuation index of the wind turbine blade 3 and the temperature index related to temperature of the wind turbine blade 3 is taken into account, to detect presence or absence of a damage of the wind turbine blade 3 on the basis of the wavelength fluctuation index calculated in the obtaining step (S6).

As described above, an influence from the temperature on the measurement value of the wavelength of reflection waves by the fiber-optic sensors 12A to 12D (i.e., the measurement value of strain) can be substantially eliminated by using the wavelength fluctuation index obtained in the obtaining step (S6). However, in reality, the output characteristics of the fiber-optic sensors 12 mounted to the wind turbine blade 3 have individual variability depending on the load applied to the wind turbine blade 3 or the temperature, and the wavelength fluctuation index obtained by each fiber-optic sensor 12 may be affected by the load and the temperature.

Thus, if presence or absence of a damage is determined by applying the same standard (e.g. threshold) to the fiber-optic sensors 12 for detecting a damage of the wind turbine blade 3, some of the sensors may fail to detect a damage appropriately, due to the range of the threshold being too narrow and resulting in issuance of a wrong alert or being too broad and resulting in failure of detection of abnormality that should be detected, in a certain load range or in a certain temperature range.

Thus, as described above, when detecting a damage of the wind turbine blade 3 on the basis of the wavelength fluctuation index, the correlation between the wavelength fluctuation index and the load index related to load applied to the wind turbine blade 3 or the temperature index related to temperature of the wind turbine blade 3 is taken into account, and thereby it is possible to suppress wrong detection or the like due to an influence of individual variability of the characteristics of the fiber-optic sensors with respect to load or temperature, and to detect a damage of a wind turbine blade accurately.

In the detection step (S10), for instance, presence or absence of a damage of the wind turbine blade 3 may be detected on the basis of a result of comparison between an evaluation value obtained from the wavelength fluctuation index of the wind turbine blade 3 and a threshold.

The evaluation value obtained from the wavelength fluctuation index of the wind turbine blade 3 may be the wavelength fluctuation index itself of the wind turbine blade 3, for instance. Alternatively, if the wind turbine rotor 5 includes a plurality of wind turbine blades 3, the above described evaluation value may be a difference between the wavelength fluctuation index of one wind turbine blade to be detected among the plurality of wind turbine blade 3 and a standard value reflecting the wavelength fluctuation index of at least one wind turbine blade for comparison among the remaining wind turbine blades (described below in more detail).

Herein, a standard value reflecting the wavelength fluctuation index of at least one wind turbine blade for comparison among the remaining wind turbine blades may be, for instance, the wavelength fluctuation index of one wind turbine blade for comparison among the remaining wind turbine blades, or the average of the wavelength fluctuation indexes of a plurality of wind turbine blades for comparison among the remaining wind turbine blades.

As described above, in a case where presence or absence of a damage of the wind turbine blade 3 is detected on the basis of a result of comparison between a threshold and an evaluation value obtained from the wavelength fluctuation index of the wind turbine blade 3, one of the above described threshold or evaluation value may be corrected on the basis of correlation between the wavelength fluctuation index and the above described load index, or correlation between the wavelength fluctuation index and the above described temperature index. Further, presence or absence of a damage of the wind turbine blade 3 may be detected by using one of a corrected threshold or a corrected evaluation value obtained by such correction.

Next, a method of detecting a damage of the wind turbine blade 3 according to some embodiments will be described, where the wind turbine rotor 5 is provided with a plurality of wind turbine blades 3.

In a method of detecting a damage of the wind turbine blade 3 according to some embodiments, the wavelength fluctuation index is obtained in the above described obtaining step (S6), the wavelength fluctuation index is calculated in the time average calculation step (S8) if needed, then a difference in the wavelength fluctuation index between the blades is calculated in the difference calculation step (S9; not shown in the flowchart of FIG. 3), and a damage of the wind turbine blade 3 is detected in the detection step (S10) on the basis of the temporal change of a difference calculated in the difference calculation step (S9).

In the difference calculation step (S9) according to an embodiment, a difference between the wavelength fluctuation index of one wind turbine blade to be detected among the three wind turbine blades 3 (or the time average thereof) and a standard value reflecting the wavelength fluctuation index of one wind turbine blade for comparison among the remaining wind turbine blades (or the time average thereof) is calculated.

The above standard value may be the wavelength fluctuation index of one wind turbine blade for comparison among the remaining wind turbine blades 3 (or the time average thereof). Furthermore, the above standard value may be the average of the wavelength fluctuation index of two or more wind turbine blades for comparison among the remaining wind turbine blades 3 (or the time average thereof), or the average of the wavelength fluctuation index of two or more wind turbine blades for comparison among the remaining wind turbine blades 3 and one wind turbine blade to be detected (or the time average thereof).

For instance, in the difference calculation step (S9), in the wind turbine 1 provided with three wind turbine blades 3 including the first to third blades, the first blade is the wind turbine blade to be detected and the wind wavelength fluctuation index $I_1$ of the first blade is calculated, while the second blade being one of the remaining wind turbine blades is the wind turbine blade for comparison and the wavelength fluctuation index $I_2$ of the second blade is calculated. Further, $I_2$ minus $I_1$ is calculated as a difference between the above wavelength fluctuation indexes. Similarly, with the second blade being the wind turbine blade to be detected and the third blade being the wind turbine blade for comparison, the difference $I_2$ minus $I_3$ of the wavelength fluctuation index is calculated. Furthermore, with the third blade being the wind turbine blade to be detected and the first blade being the wind turbine blade for comparison, the difference $I_3$ minus $I_1$ of the wavelength fluctuation index is calculated. Further, in the detection step (S10), on the basis of the differences $I_1$ minus $I_2$, $I_2$ minus $I_3$, and $I_3$ minus $I_1$ of the wavelength fluctuation index calculated in the difference calculation step (S9) as described above, a damage of the wind turbine blade 3 is detected, and the wind turbine blade 3 having a damage is specified.

Figure 5:
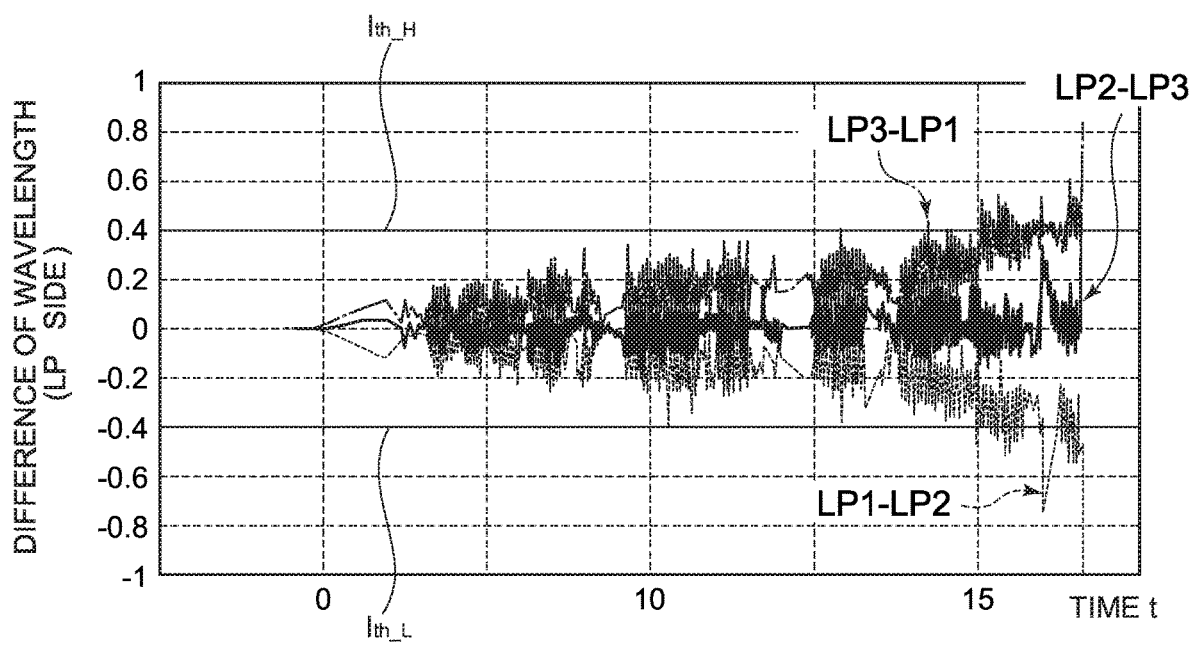
FIG. 5 is a graph showing a temporal change of a wavelength fluctuation index in a method of detecting a damage of a wind turbine blade according to an embodiment.

FIG. 5 shows a graph representing an example of a temporal change of a difference in the wavelength fluctuation index between the plurality of wind turbine blades 3 obtained in the above described difference calculation step (S9). FIG. 5 is a graph showing a temporal change of a wavelength fluctuation index in a method of detecting a damage of a wind turbine blade according to an embodiment. In FIG. 5, shown is the temporal change of the difference between blades for the wind turbine 1 provided with three wind turbine blades 3 including the first to third blades, of the time average of the wavelength fluctuation index calculated from the wavelength of reflection light obtained by the fiber-optic sensor 12A mounted to the suction side (LP side) 21 of each wind turbine blade 3.

Each sign LPn (where n is an integer from 1 to 3) in FIG. 5 shows the time average of the wavelength fluctuation index of wavelength of reflection light by the fiber-optic sensor mounted to the suction side (LP side) 22 of the n-th blade. Further, for instance, LP1-LP2 represents the time average of the wavelength fluctuation index between the suction side (LP side) 22 of the first blade and the suction side (LP side) 22 of the second blade.

The horizontal axis of the graph in FIG. 5 is an axis that represents time, which does not represent a particular unit such as day, month, and year. In the present specification, the unit of time used to describe the graph is referred to as "unit time" for the sake of convenience.

In FIG. 5 showing the difference of the wavelength fluctuation index calculated on the basis of the wavelength data of reflection light at the suction side (LP side) 22, the difference (LP2-LP3) between the second and third blades is within a constant range (e.g. not less than −0.4 and not more than 0.4) from the 0th unit time to the 15th unit time and after this on the horizontal axis. On the other hand, the absolute values of the difference between the first and second blades (LP1-LP2) and the difference between the third and first blades (LP3-LP1) increase rapidly in the vicinity of a point after past the 13th unit time on the horizontal axis. Accordingly, it can be determined that a damage is occurring and developing on the first blade which is involved in both of the two differences: the difference (LP1-LP2) between the first and second blades, and the difference (LP3-LP1) between the third and first blades.

Furthermore, with a threshold set in advance for the difference in the wavelength fluctuation index (or the average thereof), it is possible to detect a damage from the temporal change of the difference and to specify the wind turbine blade 3 with a damage. For instance, in the example in FIG. 5, it may be determined that a damage is occurring in one of the wind turbine blades 3 when the absolute value of the difference of the average of the wavelength fluctuation index exceeds 0.4.

Specifically, in this case, the threshold of the average of the wavelength fluctuation index may be set to the upper limit threshold $I_{th\_H}$=0.4, and the lower limit threshold $I_{th\_L}$=−0.4. Further, when the difference of the average of the wavelength fluctuation index is out of the range of not less than the lower limit $I_{th\_L}$ and not more than the upper limit $I_{th\_H}$, it can be determined that a damage is occurring in one of the wind turbine blades 3.

While the method of detecting a damage of the wind turbine blade 3 described in the above example uses the wavelength fluctuation index related to the suction side (LP side) 22 of the wind turbine blade 3, the same method of detecting a damage can be applied to a case where the wavelength fluctuation index related to the pressure side (HP side) 21 of the wind turbine blade 3 is used.

Next, with reference to FIGS. 6 to 11, a specific example of a detection step (S10) according to some embodiments will be described.

Figure 6:
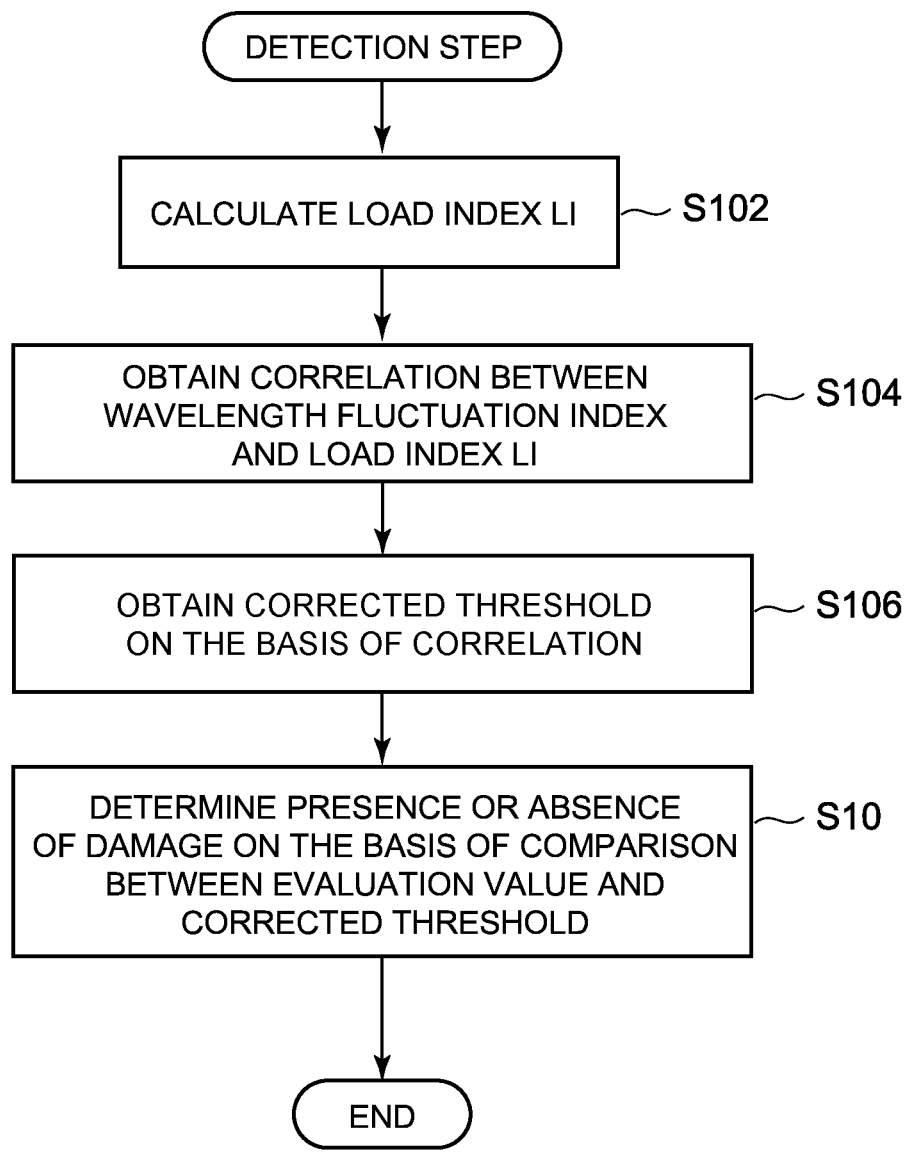
FIG. 6 is a flowchart of a detection step (S10) according to an embodiment.

FIG. 6 is a flowchart of the detection step (S10) according to an embodiment, which is a flowchart of an example of a detection step (S10) in a method of detecting a damage of the wind turbine blade 3 of the wind turbine rotor 5 including a plurality of wind turbine blades 3.

In the detection step (S10) shown in the flow chart of FIG. 6, the load index LI related to the wind turbine blade 3 is calculated (S102). Next, correlation between the wavelength fluctuation index of the plurality of wind turbine blades 3 and the average of the wavelength fluctuation index of the plurality of wind turbine blades 3 being the load index LI is obtained (S104). Further, the threshold to be compared with the evaluation value of the wavelength fluctuation index of the plurality of wind turbine blades 3 is corrected on the basis of the correlation, and a corrected threshold is obtained (S106).

Further, presence or absence of a damage of the wind turbine blade 3 is determined by comparing the corrected threshold obtained in step S106 with an evaluation value obtained from the wavelength fluctuation index of the wind turbine blade 3 (S108).

Figure 7:
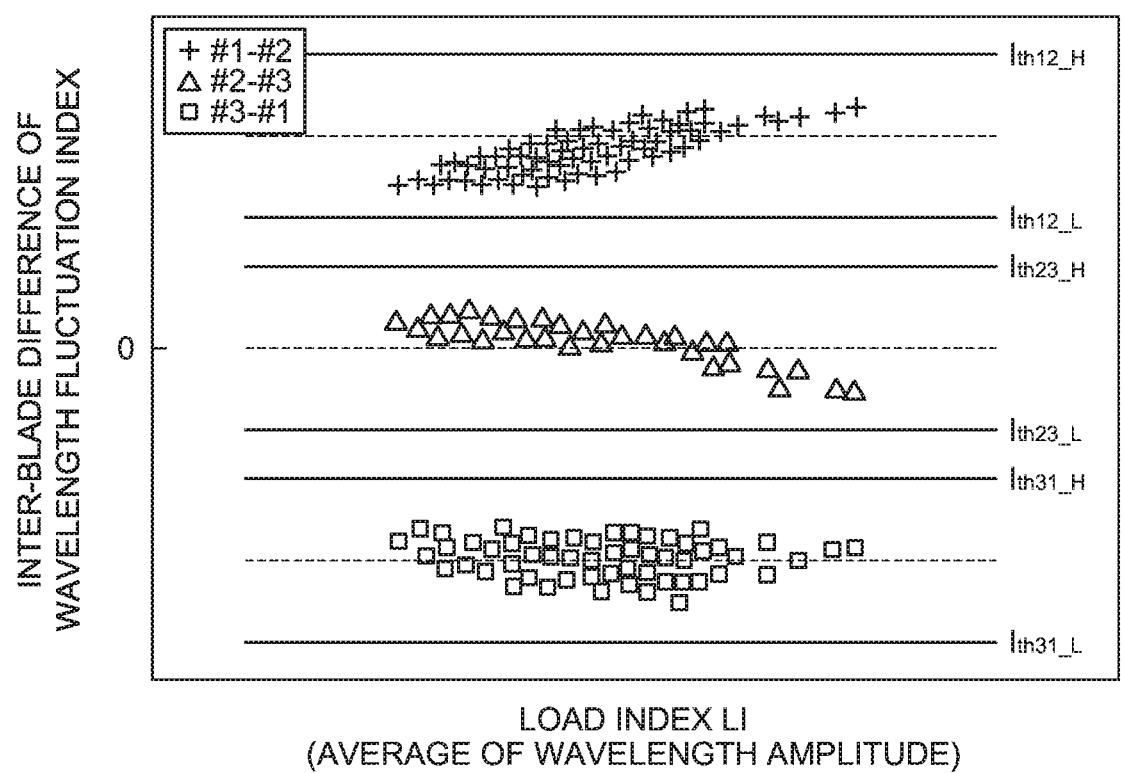
FIG. 7 is a graph showing an example of correlation between an inter-blade difference of a wavelength fluctuation index and a load index.

FIG. 7 is a graph of an example of correlation between an inter-blade difference of the wavelength fluctuation index (vertical axis) and the load index LI (horizontal axis) of the wind turbine rotor 5 provided with three wind turbine blades 3. In the drawing, the average of the wavelength fluctuation index of the plurality of wind turbine blades 3 is used as the load index LI. Herein, signs (#1-#2) and the like in the graph refer to the differences between the wavelength fluctuation index of the first blade and the wavelength fluctuation index of the second blade and the like, respectively.

Furthermore, the thresholds or the like (upper limit: $I_{th12\_H}$, lower limit: $I_{th12\_L}$) with respect to the difference (#1-#2) of the wavelength fluctuation index between the first blade and the second blade show an example of a threshold not depending on the load index LI used in a typical method of detecting a damage of a wind turbine blade.

The plot of the inter-blade difference of the wavelength fluctuation index between the plurality of wind turbine blades 3 and the load index (average of the wavelength fluctuation index of the plurality of wind turbine blades 3) shown in FIG. 7 can be obtained by accumulating a detection result of the fiber-optic sensor 12 mounted to each wind turbine blade 3 during normal operation of the wind turbine, for instance. The average of the wavelength fluctuation index of the plurality of wind turbine blades 3 as the load index LI of the wind turbine blades 3 is an average of the time average of the wavelength fluctuation index of the wind turbine blades in the same period (e.g. ten minutes between the same time t1 and the same time t2).

In the graph shown in FIG. 7, focusing on the inter-blade difference (#1-#2) of the wavelength fluctuation index between the first blade and the second blade for instance, the inter-blade difference (#1-#2) of the wavelength fluctuation index tends to increase (increasing trend) with an increase in the load index LI. Furthermore, focusing on the inter-blade difference (#2-#3) of the wavelength fluctuation index between the second blade and the third blade for instance, the inter-blade difference (#2-#3) of the wavelength fluctuation index tends to decrease (decreasing trend) with an increase in the load index LI.

Assuming that the inter-blade difference of the wavelength fluctuation index basically does not change relative to the load index LI (e.g. the inter-blade difference (#3-#1) of the wavelength fluctuation index between the third blade and the first blade in FIG. 7), a damage of the wind turbine blade 3 can be detected appropriately by using a constant threshold (upper limit: $I_{th3\_H}$, lower limit: $I_{th31\_L}$) not depending on the load index LI and comparing the threshold with the evaluation value of the wavelength fluctuation index related to each wind turbine blade 3.

On the other hand, in a case where the inter-blade difference of the wavelength fluctuation index changes relative to the load index LI like (#1-#2) or (#2-#3) in FIG. 7, a damage of the wind turbine blade 3 can be detected appropriately by applying the detection step (S10) shown in the flowchart of FIG. 6 and using the corrected threshold.

Figure 8:
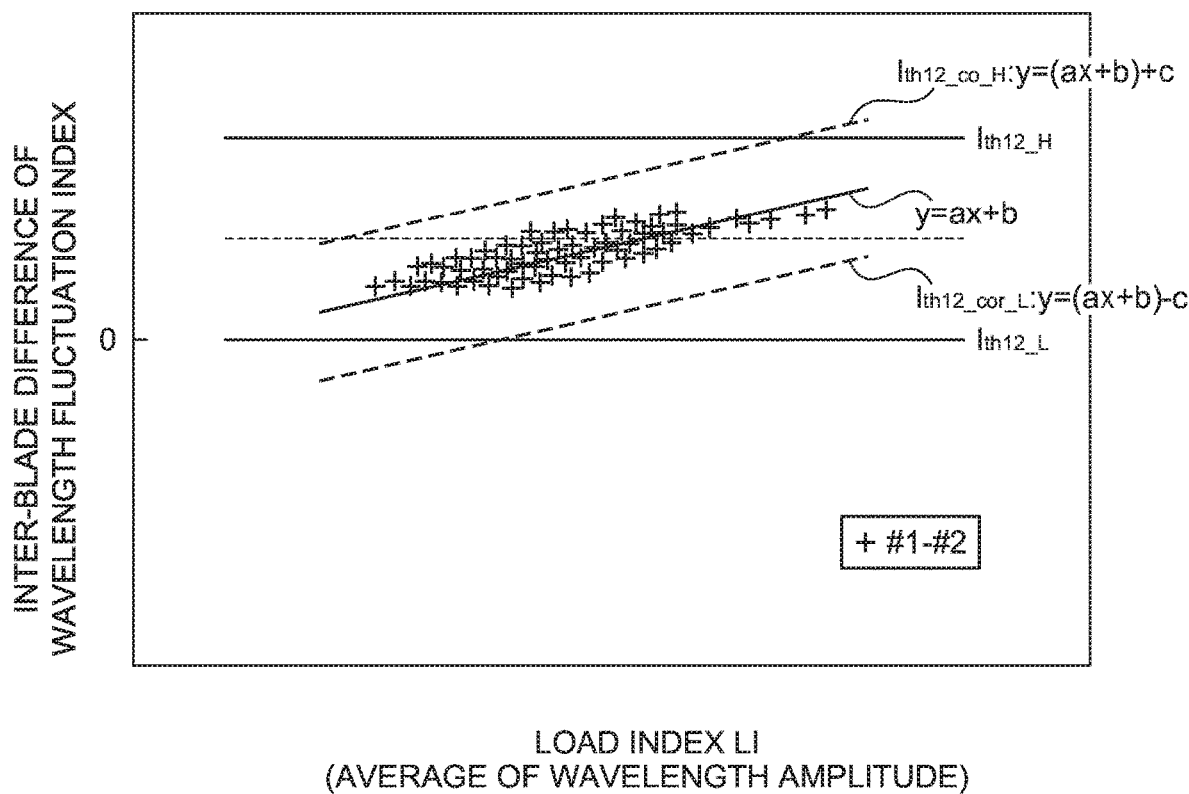
FIG. 8 is a graph showing a corrected threshold obtained on the basis of correlation between an inter-blade difference of a wavelength fluctuation index and a load index shown in FIG. 7, along with the correlation.

FIG. 8 is a graph showing the above described corrected threshold obtained on the basis of correlation between the inter-blade difference (#1-#2) (vertical axis, y axis) of the wavelength fluctuation index between the first blade and the second blade and the load index I (horizontal axis, x axis) shown in FIG. 7, along with the correlation.

Next, a procedure for obtaining the corrected threshold from the plot of the inter-blade difference (#1-#2) of the wavelength fluctuation index and the load index LI shown in FIG. 8 will be described.

First, the gradient a and the intercept b of the approximate line $L_0$ showing correlation between the inter-blade difference (#1-#2) of the wavelength fluctuation index and the load index LI are calculated (the above described step S104) on the basis of the plot in FIG. 8, as the correlation between the inter-blade difference (#1-#2) of the wavelength fluctuation index and the load index LI. The approximate line can be obtained by the least-square method, for instance.

Then, lines are obtained by moving the above described approximate line Lo in parallel in the direction of y axis by a predetermined value c and minus c, which respectively serve as corrected thresholds (upper limit: $I_{th12\_cor\_H}$, lower limit: $I_{th12\_cor\_L}$) (the above described step S106).

In step S108, the inter-blade difference (#1-#2) of the wavelength fluctuation index being an evaluation value is compared with the corrected threshold obtained in the above described step S106 corresponding to the load index LI (average of the wavelength fluctuation index of the three blades) at acquisition of the evaluation value, and thereby it is possible to evaluate presence or absence of a damage of the wind turbine blade 3. That is, if the evaluation value is not more than the upper limit threshold $I_{th12\_cor\_H}$ and not less than the lower limit threshold $I_{th12\_cor\_L}$, it can be determined that a damage is not occurring in the corresponding wind turbine blade (the first or second blade). Furthermore, if the evaluation value is greater than the upper limit threshold $I_{th12\_cor\_H}$ or smaller than the lower limit threshold $I_{th12\_cor\_L}$, it can be determined that a damage may be occurring in the corresponding wind turbine blade (the first or second blade).

Figure 9:
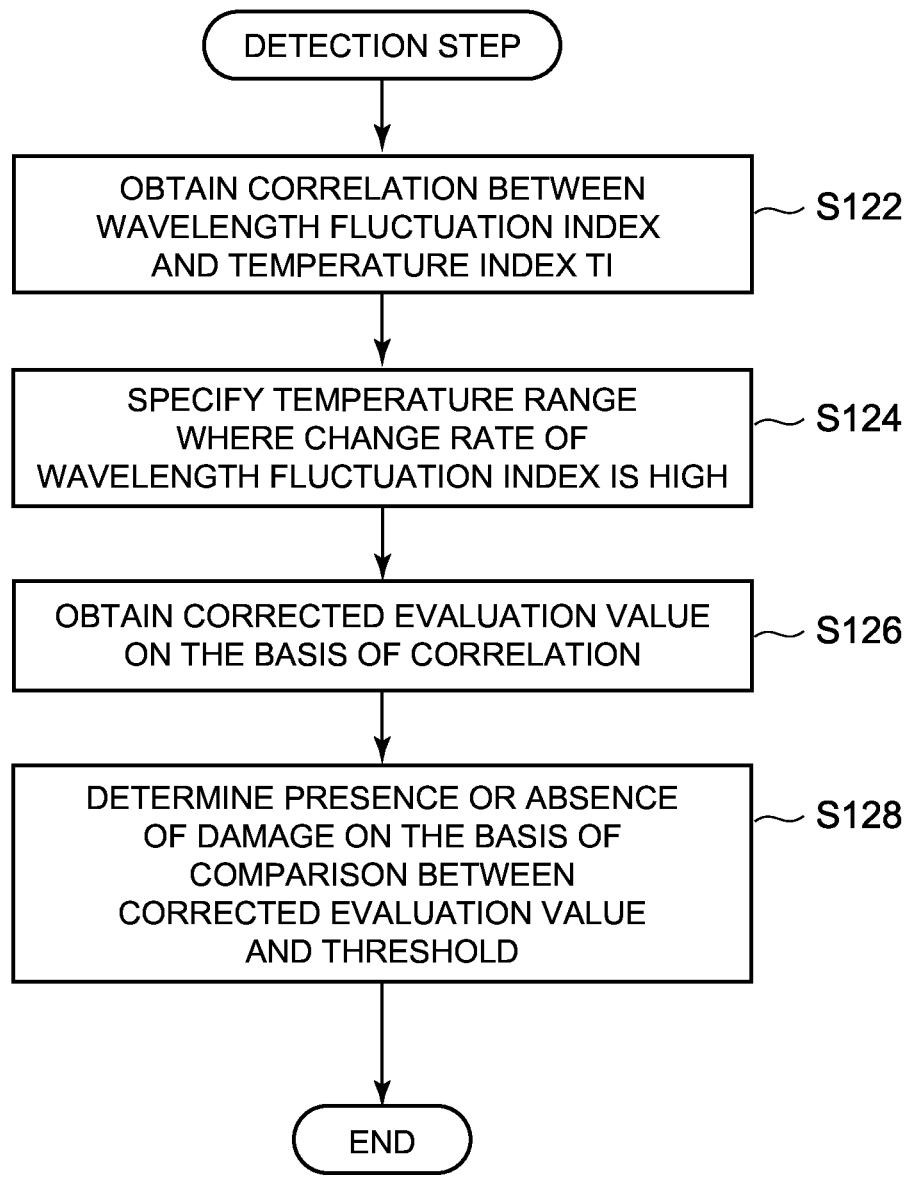
FIG. 9 is a flowchart of a detection step (S10) according to an embodiment.

FIG. 9 is a flowchart of a detection step (S10) according to an embodiment.

In the detection step (S10) shown in the flowchart of FIG. 9, correlation between the wavelength fluctuation index of the wind turbine blade 3 and the temperature index TI representing the temperature of the wind turbine blade 3 at acquisition of the wavelength fluctuation index is obtained (S122). Next, the temperature range in which the absolute value of the change rate of the wavelength fluctuation index with respect to the temperature index TI increases is specified (S124).

Further, if the temperature of the wind turbine blade 3 is in the temperature range specified in step S122, a corrected evaluation value is obtained on the basis of correlation between the wavelength fluctuation index of the wind turbine blade 3 and the temperature index TI (S126), and presence or absence of a damage of the wind turbine blade 3 is determined by comparing the corrected evaluation value with the threshold (S128).

Figure 10:
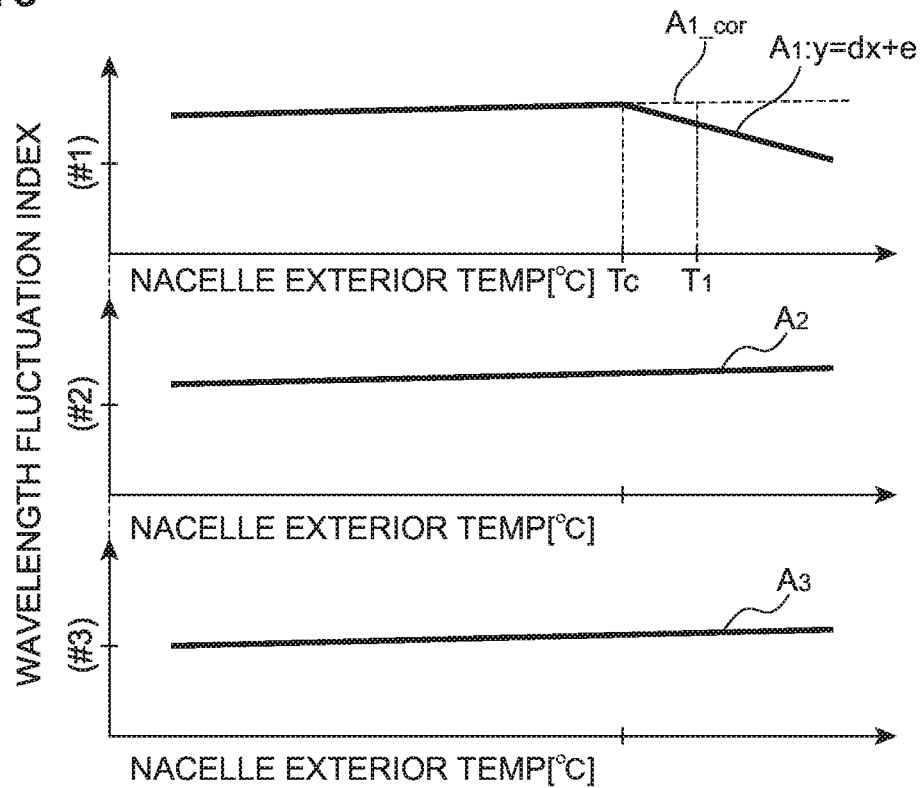
FIG. 10 is a graph showing an example of correlation between a wavelength fluctuation index and a temperature index.

FIG. 10 is a graph showing an example of correlation between the wavelength fluctuation index obtained for each of the plurality of (three) wind turbine blades 3 and the temperature index TI. In this example, an ambient temperature obtained by a thermometer disposed on the nacelle 4 is used as the temperature index TI of the wind turbine blade 3.

The solid lines (A1, A2, A3) in the respective graphs each represent correlation between the wavelength fluctuation index (vertical axis, y axis) actually obtained by the fiber-optic sensor 12 of each blade and the nacelle external temperature (temperature index TI) (horizontal axis, x axis).

The plot of the wavelength fluctuation index between the plurality of wind turbine blades 3 and the temperature index shown in FIG. 10 can be obtained by accumulating detection results of the fiber-optic sensors 12 mounted to each wind turbine blade 3 during normal operation of the wind turbine, for instance.

As shown in FIG. 10, with regard to correlation between each wind turbine blade 3 and the nacelle exterior temperature, the gradient is substantially constant between the second blade (#2) and the third blade (#3), regardless of the nacelle exterior temperature.

In contrast, in the first blade (#1), the absolute value of the change rate (gradient) of the wavelength fluctuation index relative to the nacelle exterior temperature is larger (decreasing) in the temperature range of not less than the nacelle exterior temperature Tc, than in the temperature range of less than the nacelle exterior temperature Tc. As described above, a damage of the wind turbine blade 3 can be detected by using a corrected evaluation value to which the detection step (S10) shown in the flowchart in FIG. 9 is applied, for instance, for the fiber-optic sensor 12 having a temperature range where the absolute value of the change rate of the wavelength fluctuation index relative to the temperature index TI becomes larger.

In the graph shown in FIG. 10, with regard to the first blade, the graph of the wavelength fluctuation index relative to the nacelle external temperature is decreasing in the temperature range of not less than a particular temperature (not less than the nacelle external temperature Tc). However, in another example, depending on the fiber-optic sensor, the graph of the wavelength fluctuation index relative to the nacelle exterior temperature may increase in the temperature range of not less than a particular temperature (not less than the nacelle exterior temperature Tc). Even in this case, a damage of the wind turbine blade 3 can be detected appropriately by using a corrected evaluation value to which the detection step (S10) shown in the flowchart in FIG. 9 is applied.

By applying the procedure of the detection step (S10) shown in the flowchart of FIG. 10, the graph related to the first blade of FIG. 10 can be obtained, as a result of obtaining correlation between the wavelength fluctuation index of the wind turbine blade 3 and the temperature index TI (nacelle exterior temperature) showing the temperature of the wind turbine blade 3 at acquisition of the wavelength fluctuation index for the first blade (#1) (S122 described above). Furthermore, from this graph, it can be determined that the absolute value of the change rate of the wavelength fluctuation index relative to the temperature index TI (nacelle exterior temperature) becomes greater in the temperature range of not less than the nacelle exterior temperature Tc (S124 described above). Now, in the temperature range specified in step S124, the wavelength fluctuation index A1 can be approximated by a line y=dx+e.

In a case where presence or absence of a damage of the wind turbine blade 3 is determined (S128 described above), the wavelength fluctuation index obtained by the fiber-optic sensor 12 of the first blade is corrected by using the above described expression y=dx+e (S126). For instance, if the wavelength fluctuation index at the time when the nacelle exterior temperature Tc is $I_{TC}$, as the wavelength fluctuation index $I_1$ at the time when the nacelle exterior temperature is $T_1$ (where $T_1>T_C$), $I_1$ expressed by $I_1=I_{Tc}+(T_1-T_C)\times d$ can be used by using the gradient d of the above described line (A1).

It is possible to determine presence or absence of a damage of the wind turbine blade 3 appropriately by comparing the threshold with the wavelength fluctuation index $I_1$ corrected as described above. It is possible to determine presence or absence of a damage of the wind turbine blade 3 appropriately by comparing the threshold with a corrected evaluation value which is a difference between the wavelength fluctuation index $I_1$ related to the first blade corrected as described above and the wavelength fluctuation index corrected similarly in relation to another blade (the second blade or the third blade) (S128 described above).

Figure 11:
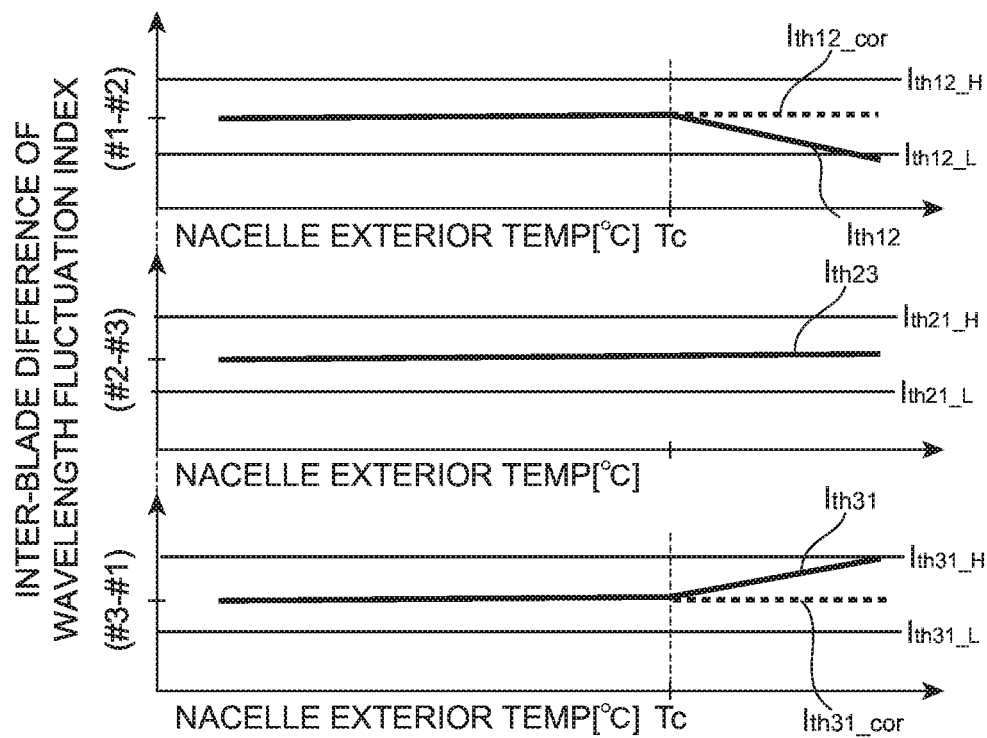
FIG. 11 is a graph of an example of correlation between an inter-blade difference of a wavelength fluctuation index and a temperature index.

FIG. 11 is a graph of an example of correlation between the inter-blade difference (#1-#2 or the like) (vertical axis) of the wavelength fluctuation index and the nacelle exterior temperature (temperature index TI). In each graph, the solid lines ($I_{12}$, $I_{23}$, $I_{31}$) each show the value of the inter-blade difference of the wavelength fluctuation index being the evaluation value obtained from the wavelength fluctuation index shown in the graph of FIG. 10. Further, in each graph, the dotted lines ($I_{12\_cor}$, $I_{23\_cor}$, $I_{31\_cor}$) each show the corrected evaluation value corrected as described above.

In a case where the inter-blade difference of the wavelength fluctuation index being an evaluation value is not corrected as described above (see the solid lines ($I_{12}$, $I_{23}$, $I_{31}$)), if the threshold (upper limit: $I_{th12\_H}$, lower limit: $I_{th12\_L}$) set for the evaluation value is constant regardless of the temperature index TI (herein, the nacelle exterior temperature) as shown in the graph 11, the strain may be calculated to be greater than the actual strain and detected wrongly, in the temperature range where the nacelle exterior temperature is not less than Tc.

In this regard, the above described corrected evaluation values ($I_{12\_cor}$, $I_{23\_cor}$, $I_{31\_cor}$) are corrected values taking account of the temperature characteristics of the fiber-optic sensor 12, and thus it is possible to detect a damage of the wind turbine blade 3 appropriately by comparing the corrected evaluation value with the threshold even in a case where the same threshold as the above threshold is used.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Wind turbine
2 Hub
3 Wind turbine blade
3a Blade root portion
3b Tip portion
4 Nacelle
5 Wind turbine rotor
6 Tower
10 Signal processing unit 11 Graph
12 (12A to 12D) Fiber-optic sensor
13 Connector
14 Fiber-optic cable
15 Connector
16 Fiber-optic cable
17 Light input part
18 Light detection part
21 Pressure side
22 Suction side
23 Leading edge side
24 Trailing edge side
100 Damage detection part

The invention claimed is:

1. A method of detecting a damage of a wind turbine blade of a wind turbine rotor including at least one wind turbine blade, the method comprising:
    a light input step of inputting light into a fiber-optic sensor mounted to each of the wind turbine blade and having a grating portion at which a refractive index changes periodically in a longitudinal direction;
    a light detection step of detecting reflection light from the grating portion;
    an obtaining step of obtaining a wavelength fluctuation index which represents a fluctuation amount of a wavelength of the reflection light detected in the light detection step from a temporal change of the wavelength; and
    a detection step of detecting presence or absence of a damage of the wind turbine blade on the basis of the wavelength fluctuation index calculated in the obtaining step,
    wherein the detection step comprises detecting the presence or the absence of the damage of the wind turbine blade on the basis of the wavelength fluctuation index taking account of at least one of a correlation between the wavelength fluctuation index of the wind turbine blade and a load index related to a load applied to the wind turbine blade, or a correlation between the wavelength fluctuation index of the wind turbine blade and a temperature index related to a temperature of the wind turbine blade, and
    wherein the detection step comprises detecting the presence or the absence of the damage of the wind turbine blade on the basis of a result of comparison between an evaluation value obtained from the wavelength fluctuation index of the wind turbine blade and a corrected threshold that is corrected on the basis of the correlation.

2. The method of detecting a damage of a wind turbine blade according to claim 1,
    wherein the detection step comprises detecting the presence or the absence of the damage of the wind turbine blade on the basis of a result of comparison between an evaluation value obtained from the wavelength fluctuation index of the wind turbine blade and a threshold, and
    wherein the evaluation value to be compared to the threshold is a corrected evaluation value corrected on the basis of the correlation.

3. The method of detecting a damage of a wind turbine blade according to claim 1,
    wherein the wind turbine rotor comprises a plurality of wind turbine blades, and
    wherein the detection step comprises:
        calculating an average of the wavelength fluctuation index of the plurality of wind turbine blades as the load index;
        obtaining the corrected threshold or the corrected evaluation value on the basis of correlation between the wavelength fluctuation index of one wind turbine blade to be detected among the plurality of wind turbine blades and the average of the wavelength fluctuation index of the plurality of wind turbine blades; and
        detecting the damage of the wind turbine blade by using the corrected threshold or the corrected evaluation value.

4. The method of detecting a damage of a wind turbine blade according to claim 1,
    wherein the detection step comprises:
        specifying a temperature range in which an absolute value of a change rate of the wavelength fluctuation index relative to the temperature index becomes larger; and
        detecting the damage of the wind turbine blade by using the corrected threshold or the corrected evaluation value obtained on the basis of the correlation between the wavelength fluctuation index of the wind turbine blade and the temperature index when a temperature of the wind turbine blade is in the temperature range.

5. The method of detecting a damage of a wind turbine blade according to claim 1,
    wherein the obtaining step comprises calculating a difference between a maximum of the wavelength and a minimum of the wavelength in the temporal change as the wavelength fluctuation index.

6. The method of detecting a damage of a wind turbine blade according to claim 5,
    wherein the obtaining step comprises calculating a difference between the maximum and the minimum which appear alternately and repeatedly corresponding to a rotation period of the wind turbine rotor as the wavelength fluctuation index.

7. The method of detecting a damage of a wind turbine blade according to claim 1, further comprising:
    a time-average calculation step of calculating an average of the wavelength fluctuation index calculated in the obtaining step for a period not shorter than a rotation period of the wind turbine rotor,
    wherein the detection step comprises detecting the damage of the wind turbine blade on the basis of the average calculated in the time-average calculation step.

8. The method of detecting a damage of a wind turbine blade according to claim 1,
    wherein the wind turbine rotor comprises a plurality of wind turbine blades,
    wherein the method further comprises a difference calculation step of calculating a difference between the wavelength fluctuation index of one wind turbine blade to be detected from among the plurality of wind turbine blades and a reference value reflecting the wavelength fluctuation index of at least one wind turbine blade for comparison from among remaining wind turbine blades as the evaluation value, and
    wherein the detection step comprises detecting the damage of the wind turbine blade to be detected on the basis of a temporal change of the difference calculated in the difference calculation step.

9. The method of detecting a damage of a wind turbine blade according to claim 8, wherein the wind turbine rotor comprises three or more wind turbine blades, wherein the difference calculation step is repeated for each of the wind turbine blades being the wind turbine blade to be detected to calculate the difference for each of the wind turbine blades, and wherein the detection step comprises specifying the wind turbine blade having the damage on the basis of the difference of each of the wind turbine blades.

10. A method of detecting a damage of a wind turbine blade of a wind turbine rotor including at least one wind turbine blade, the method comprising:

a light input step of inputting light into a fiber-optic sensor mounted to each of the wind turbine blade and having a grating portion at which a refractive index changes periodically in a longitudinal direction;

a light detection step of detecting reflection light from the grating portion;

an obtaining step of obtaining a wavelength fluctuation index which represents a fluctuation amount of a wavelength of the reflection light detected in the light detection step from a temporal change of the wavelength; and a detection step of detecting presence or absence of a damage of the wind turbine blade on the basis of the wavelength fluctuation index calculated in the obtaining step, wherein the detection step comprises detecting the presence or the absence of the damage of the wind turbine blade on the basis of the wavelength fluctuation index taking account of at least one of a correlation between the wavelength fluctuation index of the wind turbine blade and a load index related to a load applied to the wind turbine blade, or a correlation between the wavelength fluctuation index of the wind turbine blade and a temperature index related to a temperature of the wind turbine blade, wherein the obtaining step comprises calculating a difference between a maximum of the wavelength and a minimum of the wavelength in the temporal change as the wavelength fluctuation index, and wherein, provided that T is a rotation period of the wind turbine rotor, the obtaining step comprises not determining a second extreme value next to a first extreme value which is the maximum or the minimum, until a period t (where $0.1\ T \leq t \leq 0.5\ T$) elapses after a point of time when the first extreme value appears.

11. A wind turbine, comprising:

a wind turbine rotor including at least one wind turbine blade;

a fiber-optic sensor mounted to each of the wind turbine blade and having a grating portion at which a refractive index changes periodically in a longitudinal direction;

a light input part for inputting light into the fiber-optic sensor;

a light detection part for detecting reflection light from the grating portion; and a detection part for detecting a damage of the wind turbine blade, wherein the detection part is configured to:

obtain a wavelength fluctuation index which represents a fluctuation amount of a wavelength of the reflection light detected by the light detection part from a temporal change of the wavelength;

detect presence or absence of the damage of the wind turbine blade on the basis of the wavelength fluctuation index taking account of at least one of a correlation between the wavelength fluctuation index of the wind turbine blade and a load index related to a load applied to the wind turbine blade, or a correlation between the wavelength fluctuation index of the wind turbine blade and a temperature index related to a temperature of the wind turbine blade; and detect the presence or the absence of the damage of the wind turbine blade on the basis of a result of comparison between an evaluation value obtained from the wavelength fluctuation index of the wind turbine blade and a corrected threshold that is corrected on the basis of the correlation.

\* \* \* \* \*